(12) United States Patent  (10) Patent No.: US 7,791,395 B2
Yanagisawa et al.  (45) Date of Patent: Sep. 7, 2010

(54) DC OFFSET CORRECTING DEVICE AND DC OFFSET CORRECTING METHOD

(75) Inventors: Kiyoshi Yanagisawa, Tokyo (JP); Noriaki Matsuno, Tokyo (JP)

(73) Assignee: NEC Corporation, Tokyo (JP)

( * ) Notice: Subject to any disclaimer, the term of this patent is extended or adjusted under 35 U.S.C. 154(b) by 67 days.

(21) Appl. No.: 12/297,905

(22) PCT Filed: Feb. 15, 2007

(86) PCT No.: PCT/JP2007/052743
§ 371 (c)(1), (2), (4) Date: Oct. 21, 2008

(87) PCT Pub. No.: WO2007/122844
PCT Pub. Date: Nov. 1, 2007

(65) Prior Publication Data
US 2009/0174456 A1 Jul. 9, 2009

(30) Foreign Application Priority Data
Apr. 21, 2006 (JP) .............................. 2006-117975

(51) Int. Cl.
*H03L 5/00* (2006.01)
(52) U.S. Cl. ...................................... 327/307; 327/362
(58) Field of Classification Search ......... 327/306–307, 327/362
See application file for complete search history.

(56) References Cited
U.S. PATENT DOCUMENTS
4,063,169 A * 12/1977 Palmer .................. 324/76.56
6,954,625 B2 * 10/2005 Cowley ...................... 455/259
7,127,010 B1 * 10/2006 Parker ......................... 375/344
7,418,029 B2 * 8/2008 Richards et al. ............. 375/150

FOREIGN PATENT DOCUMENTS

| | | |
|---|---|---|
| JP | 63-023413 | 1/1988 |
| JP | 09-247494 | 9/1997 |
| JP | 10-136048 | 5/1998 |
| JP | 11-122508 | 4/1999 |
| JP | 2001-285387 | 10/2001 |
| JP | 2004-221653 | 8/2004 |
| WO | 2006/137387 | 12/2006 |

* cited by examiner

Primary Examiner—Dinh T. Le
(74) Attorney, Agent, or Firm—Young & Thompson

(57) ABSTRACT

A signal generator generates a test signal including a positive signal and a negative signal which have the same amplitude. The signal generator corrects a DC level of the test signal based on a DC offset correcting signal supplied thereto, and supplies the corrected test signal to a frequency converter. An amplitude detector detects the amplitudes of the positive and negative signals of the test signal processed by the frequency converter. A level compressor converts in level the amplitudes of the positive and negative signals which are detected by the amplitude detector, with a gain variable depending on an input level thereto. A comparator compares the amplitudes of the positive and negative signals which are converted in level by the level compressor, with each other. An offset adjuster supplies the DC offset correcting signal depending on a compared result from the comparator to the signal generator.

22 Claims, 16 Drawing Sheets

DIFFERENTIAL SIGNAL INPUT

DIFFERENTIAL SIGNAL OUTPUT

DC OFFSET CORRECTING DEVICE AND DC OFFSET CORRECTING METHOD

TECHNICAL FIELD

The present invention relates to a DC offset correcting device for correcting a DC offset in a signal processing circuit, and more particularly to the detection and correction of a DC offset in a DC offset correcting device.

BACKGROUND ART

Transmitters for use in communication terminals of communication systems include signal processing circuits such as a mixer for frequency conversion and an amplifier for power amplification. The transmitter processes an input modulation signal (baseband signal) using the signal processing circuits, and outputs the processed signal.

The operation of frequency conversion by a mixer as an example of the signal processing circuits will be described below.

If the mixer includes a DC (Direct Current) level shift in its characteristics or a baseband signal input to the mixer includes a DC component, then a high-frequency signal output from the mixer includes a carrier leak due to the DC offset. FIG. 1 is a graph showing the transmission spectrum of an ideal high-frequency signal, and FIG. 2 is a graph showing the transmission spectrum of a high-frequency signal including a carrier leak.

As can be understood from a comparison between FIGS. 1 and 2, the waveform (FIG. 2) of the signal including the carrier leak is different from the waveform (FIG. 1) of the ideal signal. The difference tends to degrade the EVM (Error Vector Magnitude) of the high-frequency output signal transmitted from the transmitter.

FIG. 3 is a block diagram showing the arrangement of a general transmitter. As shown in FIG. 3, the transmitter comprises signal generator 91, frequency converter 92, amplitude detector 93, and offset adjuster 94.

Signal generator 91 comprises a baseband circuit and generates and sends a baseband signal to frequency converter 92.

Frequency converter 92 comprises a mixer and frequency-converts the baseband signal input from signal generator 91 into an RF (Radio Frequency) signal, amplifies or attenuates the RF signal, and outputs the RF signal. The output from frequency converter 92 serves as the output of the transmitter.

Amplitude detector 93 comprises a spectrum analyzer and detects the amplitude of the RF signal output from frequency converter 92 and indicates the amplitude value thereof to offset adjuster 94.

Based on the amplitude value indicated by amplitude detector 93, offset adjuster 94 generates a DC offset correcting signal for correcting a DC offset, and feeds back the DC offset correcting signal to signal generator 91.

With the above arrangement, the transmitter shown in FIG. 3 monitors whether a carrier leak is found in the frequency spectrum of the high-frequency signal from the mixer or not. If a carrier leak is found, the transmitter adjusts the DC level to cancel the carrier leak using a circuit such as a DAC (Digital to Analog Converter) in signal generator 91 (baseband circuit), for thereby minimizing the DC offset component.

The relationship between the DC offset and the carrier leak in the RF transmission output will be described in detail below.

The mixer amplifies the power of the high-frequency output signal generated by mixing the baseband signal and a local signal, for thereby generating the output signal of the transmitter. Transmission output Pout of the transmitter which is in an ideal state free of a DC offset is expressed by equation (1):

$$Pout = A(t) \cdot \sin(\omega t) \quad (1)$$

where $A(t)$ represents the baseband signal input to the mixer and $\sin(\omega t)$ the local signal.

The transmission spectrum of ideal transmission output Pout is shown in FIG. 1. In FIG. 1, the horizontal axis indicates the frequency and the vertical axis the intensity of signal component SGNL (generally referred to as a frequency spectrum) at each frequency. It is understood from FIG. 1 that signal component SGNL depending on the frequency can be obtained.

If baseband signal $A(t)$ input to the mixer is an I/Q (In-phase/Quadrature-phase) signal and DC offset B is present in the I/Q signal, then transmission output Pout is expressed by equation (2):

$$Pout = A(t) \cdot \sin(\omega t) + B \sin(\omega t) \quad (2)$$

As can be seen from the equation (2), transmission output Pout contains carrier leak $B \sin(\omega t)$ due to DC offset B. The frequency spectrum of transmission output Pout which contains the carrier leak is shown in FIG. 2.

In FIG. 2, the horizontal axis indicates the frequency and the vertical axis the intensity of signal component SGNL at each frequency.

As can be understood from FIG. 2, the frequency spectrum includes carrier leak CRLK due to DC offset B in addition to normal signal component SGNL.

It is known that the carrier leak caused by the DC offset component degrades the EVM of the high-frequency output signal of a communication system, thus degrading the communication quality.

It is also known with respect to communication systems that other circuits than the mixer, such as a baseband power amplifier that precedes the mixer, tend to cause a carrier leak due to the DC offset component. The carrier leak thus caused is also responsible for degrading the communication quality of the communication system.

It is preferable for the communication system to minimize the degradation of the communication quality caused by the DC offset component, and ideally to eliminate the DC offset component. It has been customary for transmitters according to the background art to detect the intensity of a carrier leak with a spectrum analyzer and adjust the DC level of the signal in a direction to minimize the intensity of the carrier leak.

As an arrangement for adjusting the DC level, there has been proposed a Cartesian loop negative-feedback amplifier for adjusting a DC offset that is input to an orthogonal modulator (see, for example, JP-A No. 10-136048).

DISCLOSURE OF THE INVENTION

If the DC offset is adjusted to a minimum then the magnitude of the DC offset is of a sufficiently small value compared with the magnitude of a transmission signal for transmitting information. In order to compensate for the DC offset with high accuracy, amplitude detector 93 has to be able to detect such a small signal.

Detecting circuits for detecting the intensity of the DC offset component have circuit parameters which practically suffer variations. Therefore, they are unable to detect the intensities of DC offset signals unless the intensities are greater than a certain level.

It is assumed that the remaining offsets of I, Q of frequency converter 92 are represented by $I_{offset}$, $Q_{offset}$ and the gain of the circuit from frequency converter 92 to amplitude detector 93 by G. The magnitudes of DC offset components to be detected by amplitude detector 93 are given as $G \times \sqrt{(I_{offset}^2 + Q_{offset}^2)}$. Therefore, amplitude detector 93 detects amplitude levels $G \times \sqrt{(I_{offset}^2 + Q_{offset}^2)}$ and compare them with each other.

As described above, it is necessary to compensate for DC offsets with high accuracy to reduce DC offsets $I_{offset}$, $Q_{offset}$ that remain after the compensation to sufficiently small values. In order to compare amplitude levels $G \times \sqrt{(I_{offset}^2 + Q_{offset}^2)}$ with each other highly accurately using a detecting circuit which is unable to detect the intensities of DC offset signals unless the intensities are greater than a certain level, gain G may be increased. In order to increase gain G, the high-frequency signal input to the detecting circuit of amplitude detector 93 may be amplified. However, since a high-gain RF amplifier is required to amplify the high-frequency signal, the circuit scale of the transmitter is increased and so is the power consumption thereof.

It is an object of the present invention to provide a DC offset correcting device and method for adjusting a DC offset highly accurately with an arrangement which is small in scale and low in power consumption.

To achieve the above object, there is provided in accordance with the present invention a DC offset correcting device for correcting a DC offset of a frequency converter, comprising:

a signal generator for generating a test signal including a positive signal having a predetermined amplitude from a reference voltage in a positive direction and a negative signal having the same amplitude as the positive signal from the reference voltage in a negative direction, correcting a DC level of the test signal based on a DC offset correcting signal supplied thereto, and supplying the corrected test signal to the frequency converter;

an amplitude detector for detecting the amplitudes of the positive and negative signals of the test signal processed by the frequency converter;

a level compressor for converting in level the amplitudes of the positive and negative signals which are detected by the amplitude detector, with a gain variable depending on an input level thereto;

a comparator for comparing the amplitudes of the positive and negative signals which are converted in level by the level compressor, with each other; and an offset adjuster for generating the DC offset correcting signal depending on a compared result from the comparator, and supplying the DC offset correcting signal to the signal generator.

BEST MODE FOR CARRYING OUT THE INVENTIONS

The mode for carrying out the present invention will be described in detail below with reference to the drawings. A DC offset correcting device as applied to a transmitter will be illustrated below.

Figure 1:
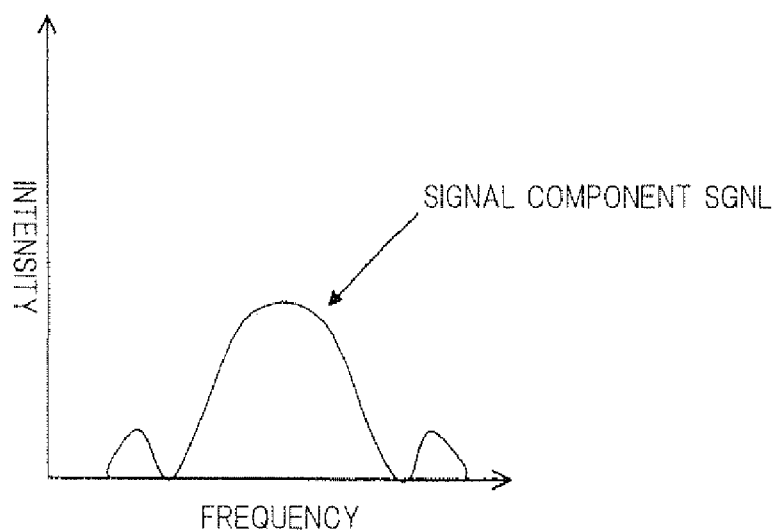
FIG. 1 is a graph showing the transmission spectrum of an ideal high-frequency signal.
Figure 2:
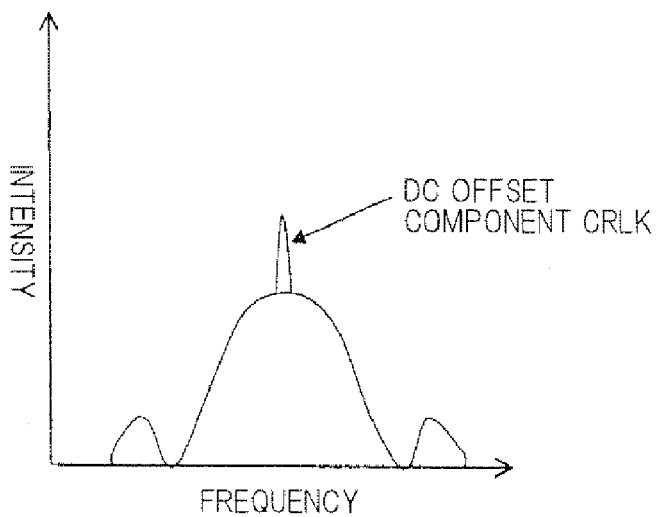
FIG. 2 is a graph showing the transmission spectrum of a high-frequency signal including a carrier leak.
Figure 3:
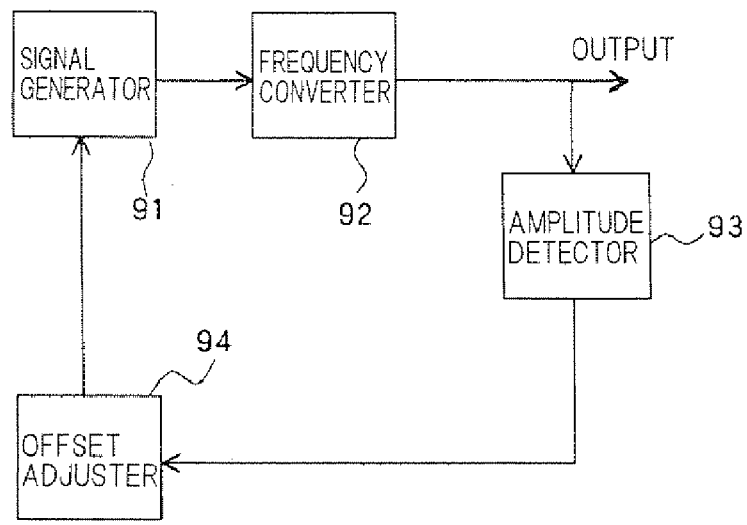
FIG. 3 is a block diagram showing the arrangement of a general transmitter.
Figure 4:
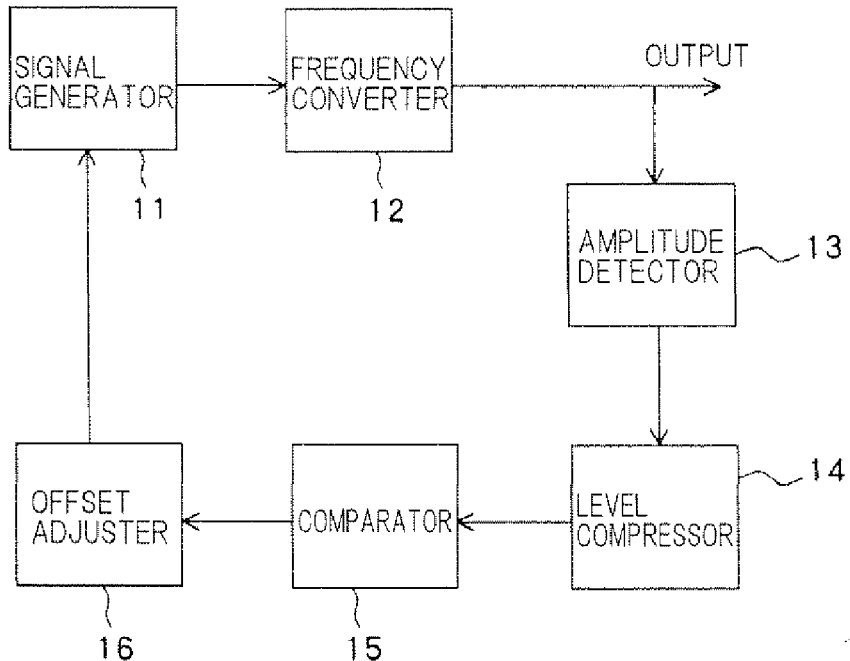
FIG. 4 is a block diagram showing the arrangement of a DC offset correcting device according to an exemplary embodiment of the present invention.

FIG. 4 is a block diagram showing the arrangement of a DC offset correcting device according to an exemplary embodiment of the present invention. As shown in FIG. 4, the DC offset correcting device according to the present exemplary embodiment comprises signal generator 11, frequency converter 12, amplitude detector 13, level compressor 14, comparator 15, and offset adjuster 16.

Signal generator 11 generates and supplies a test signal to frequency converter 12. At this time, when signal generator 11 receives a DC offset correcting signal from offset adjuster 16, signal generator 11 combines the DC offset correcting signal with the test signal.

Frequency converter 12 frequency-converts the signal input from signal generator 11 into an RF signal, amplifies or attenuates the RF signal, and outputs the RF signal. The output from frequency converter 12 serves as the output of the transmitter.

Amplitude detector 13 detects the amplitude of the signal output from frequency converter 12 and sends a level signal indicative of the amplitude to level compressor 14. The amplitude detected by amplitude detector 13 will not be of a negative value.

Level compressor 14 compresses the level of the signal output from amplitude detector 13, and sends the produced level signal to comparator 15.

Comparator 15 compares level signals output in a time sequence from level compressor 14, and sends the compared result to offset adjuster 16. The level signal from amplitude detector 13 will not be of a negative value, and the level signal which is compressed in level by level compressor 14 will not be of a negative value.

Based on the compared result output from comparator 15, offset adjuster 16 generates a DC offset correcting signal for correcting a DC offset in signal generator 11, and feeds back the DC offset correcting signal to signal generator 16.

Figure 5:
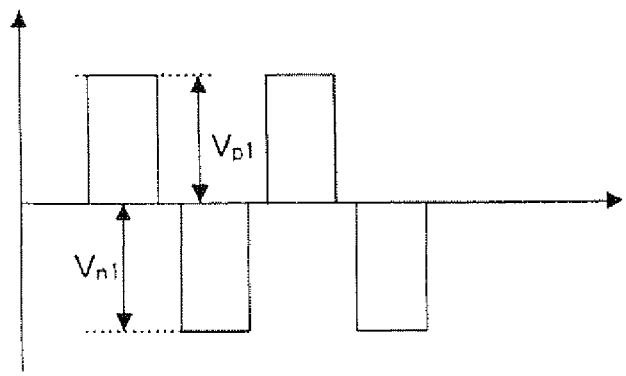
FIG. 5 is a diagram showing an example of a test signal.

In the transmitter thus constructed, the test signal generated by test generator 11 includes a positive signal and a negative signal which are positive and negative, respectively, with respect to a reference potential or a reference current. The positive signal and the negative signal have equal amplitudes. FIG. 5 shows an example of the test signal. The test signal shown in FIG. 5 includes a positive signal comprising a positive rectangular wave and a negative signal comprising a negative rectangular wave. The positive signal and the negative signal may appear in any order. The positive signal and the negative signal may be spaced from each other at any intervals, and may be spaced from each other by any signals therebetween. When amplitude detector 13 receives the test signal shown in FIG. 5, amplitude detector 13 detects the amplitudes of the positive and negative signals of the test signal. In FIG. 5, the amplitude of the positive signal is indicated by $V_{p1}$, and the amplitude of the negative signal is indicated by $V_{n1}$. $V_{p1}$ and $V_{n1}$ are equal to each other.

Figure 6:
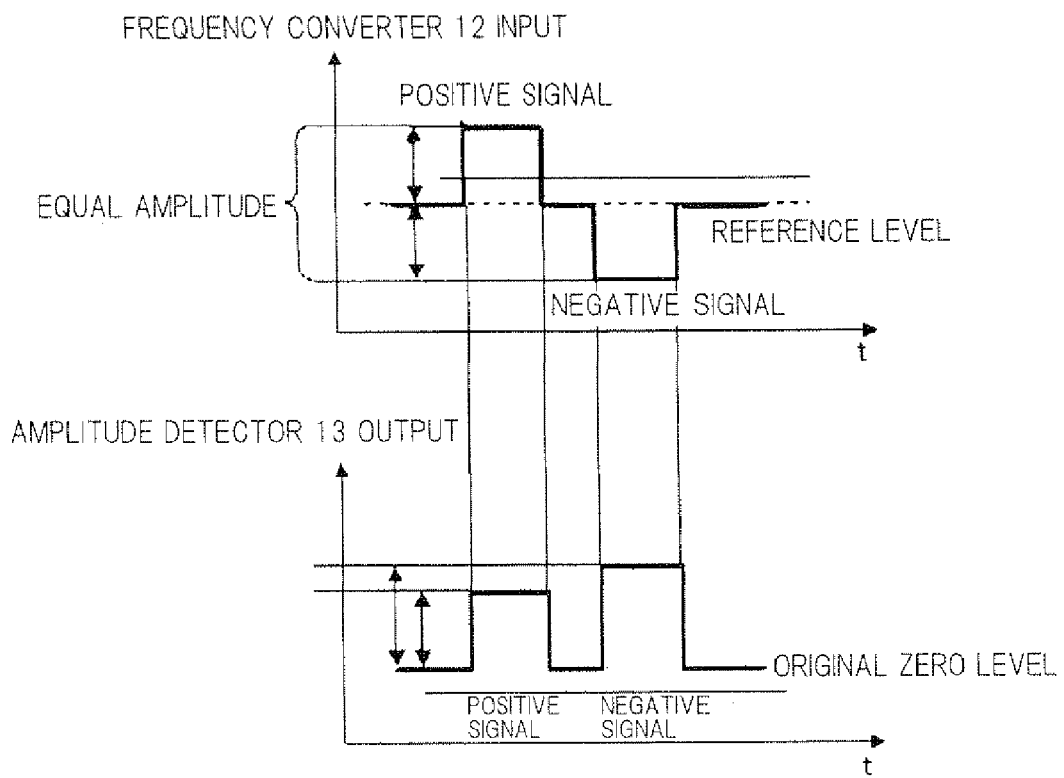
FIG. 6 is a diagram showing the manner in which amplitude detector 13 detects the amplitude of the test signal.

FIG. 6 is a diagram showing the manner in which amplitude detector 13 detects the amplitude of the test signal. Frequency converter 12 is supplied with a test signal including a positive signal and a negative signal which have equal amplitudes. However, because of a DC offset caused by a DC level shift according to the characteristics of frequency converter 12 and a DC component that is present in the baseband signal, the level of the signal sent from frequency converter 12 to amplitude detector 13 is different from the original level.

The DC offset correcting device according to the present exemplary embodiment adjusts the level of the output signal to cancel the DC offset by feeding back remaining offsets. According to the present exemplary embodiment, it is assumed by way of example that the test signal supplied from signal generator 11 to frequency converter 12 is an i/Q signal and the offset of its Q is adjusted.

It is assumed that the remaining offsets of I, Q of frequency converter 12 are represented by $I_{offset}$, $Q_{offset}$, the gain of the circuit from frequency converter 12 to amplitude detector 13 by G', and the gain of the circuit from a stage following amplitude detector 13, including level compressor 14, to comparator 15 by $G_{IF}$. The test signal comprises a rectangular wave including a positive signal and a negative signal which have amplitude A sufficiently large compared with the amplitudes of allowable remaining offsets.

Amplitude detector 13 detects the respective amplitudes of the positive signal and the negative signal. The detected amplitude of the positive signal is indicated by the equation (3) and the detected amplitude of the negative signal is indicated by the equation (4).

$$G' \times \sqrt{I_{offset}^2 + (Q_{offset} - A)^2} \tag{3}$$

$$G' \times \sqrt{I_{offset}^2 + (Q_{offset} + A)^2} \tag{4}$$

Level compressor 14 compresses the amplitudes of the positive and negative signals which are detected by amplitude detector 13 with gain $G_{IF}$. The amplitude of the positive signal output from level compressor 14 is indicated by the equation (5), and the amplitude of the negative signal output from level compressor 14 is indicated by the equation (6).

$$G_{IF} \times G' \times \sqrt{I_{offset}^2 + (Q_{offset} - A)^2} \tag{5}$$

$$G_{IF} \times G' \times \sqrt{I_{offset}^2 + (Q_{offset} + A)^2} \tag{6}$$

Level compressor 14 changes gain $G_{IF}$ used for level compression depending on the signal level. The changing of gain $G_{IF}$ will be described below.

Comparator 15 compares the positive signal and the negative signal that are output from level comparator 14. Since remaining offsets $I_{offset}$, $Q_{offset}$ are small compared with amplitude A of the test signal, level difference D obtained by comparator 15 is indicated by the equation (7).

$$\begin{aligned} D &= G_{IF} \times G' \times \sqrt{I_{offset}^2 + (Q_{offset} + A)^2} - \\ &\quad G_{IF} \times G' \times \sqrt{I_{offset}^2 + (Q_{offset} + A)^2} \\ &= G_{IF} \times G' \times |Q_{offset} + A| - G_{IF} \times G' \times |Q_{offset} - A| \\ &= G_{IF} \times G' \times (Q_{offset} + A) + G_{IF} \times G' \times (Q_{offset} - A) \\ &= G_{IF} \times G' \times 2 \times Q_{offset} \end{aligned} \tag{7}$$

Due to circuit variations, comparator 15 is unable to detect signals accurately unless the signals have a predetermined value or greater. In order for comparator 15 to compare signals accurately, level difference D has to have the predetermined value or greater. In a region where $Q_{offset}$ is small, therefore, it is necessary to increase gain $G_{IF}$.

According to the scaled-down CMOS process in recent years, the power supply has a lower voltage and the operating range of circuits is smaller. If a large gain is to be obtained in a region where $Q_{offset}$ is large for amplifying signals to make level difference D equal to or greater than the predetermined value, then the output signal tends to exceed the operating range and become saturated, with the result that the DC offset correcting device will operate in error. Accordingly, it is not preferable to increase gain $G_{IF}$ in the region where $Q_{offset}$ is large.

Particularly, if the rectangular wave including the positive and negative signals having the same amplitude A is used as the test signal, then when the DC offset is completely compensated for, i.e., when $I_{offset}$, $Q_{offset}$ are minimized, it is necessary to compare the signals with utmost accuracy. Conversely, as the DC offset becomes less and less completely canceled, i.e., as $I_{offset}$, $Q_{offset}$ become greater, the required accuracy becomes lower.

In view of the above analysis, comparator 14 increases gain $G_{IF}$ when the signal level is lower and reduces gain $G_{IF}$ when the signal level is higher.

Figure 7:
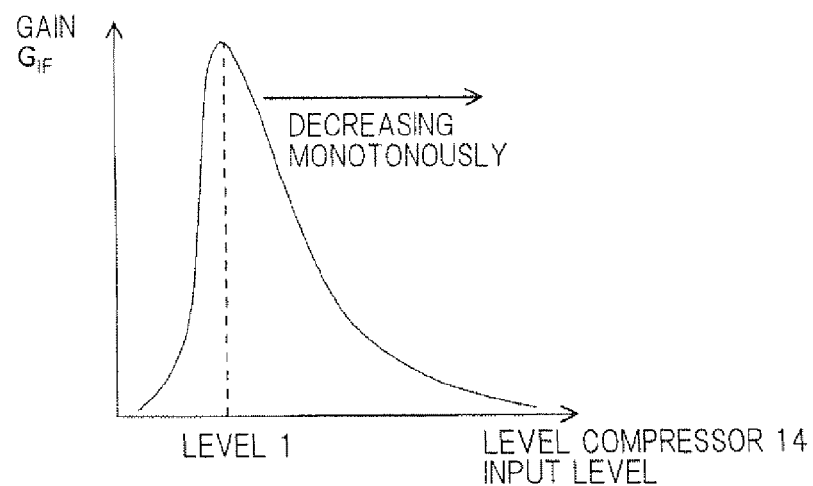
FIG. 7 is a graph showing an example of the relationship between an input to level compressor 14 and gain $G_{IF}$.
Figure 8:
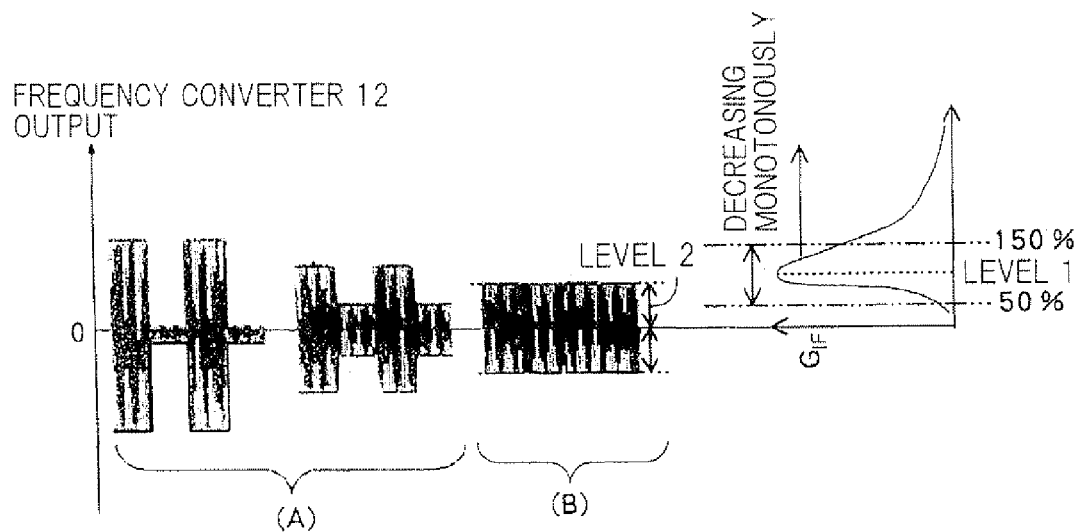
FIG. 8 is a diagram illustrative of the relationship between an output signal of frequency converter 12 and gain $G_{IF}$ characteristics.

FIG. 7 is a graph showing an example of the relationship between an input to level compressor 14 and gain $G_{IF}$. FIG. 8 is a diagram illustrative of the relationship between an output signal of frequency converter 12 and gain $G_{IF}$ characteristics.

According to the gain $G_{IF}$ characteristics shown in FIG. 7, gain $G_{IF}$ is small in a region where the input level of level compressor 14 is of a small value lower than the threshold of the transistor. In that region, gain $G_{IF}$ increases monotonously as the input level increases. In a region where the input level is greater than the threshold, gain $G_{IF}$ decreases monotonously as the input level decreases. In a region where the input level is close to the power supply voltage, gain $G_{IF}$ is small. Since gain $G_{IF}$ is set to decreases monotonously from the region where high accuracy is required and the input level is large toward the region where high accuracy is not required and the input level is small with the transistor tending to become saturated, gain $G_{IF}$ can be set to appropriate values depending on the accuracy required at respective input levels.

In FIG. 8, (A) indicates a test signal having a large DC offset and (B) a test signal free of a DC offset. If the level of the signal that is input to level compressor 14 when the test signal free of a DC offset as shown in (B) is input to frequency converter 12 is input level 2, then, as shown in FIG. 8, input level 2 is set in a range from 50% (half) to 150% (1.5 times) of input level 1.

As described above, the amplitude detection with the utmost accuracy is required when the DC offset is removed. If input level 2 is set in the range from 50% to 150% of input level 1, then gain $G_{IF}$ is of a value near the peak when the test signal free of a DC offset is input to frequency converter 12. As a result, gain $G_{IF}$ can be of a large value when the amplitude detection with the utmost accuracy is required.

Level compressor 14 for compressing the level according to the gain characteristics shown in FIG. 7 and amplitude detector 13 for supplying a level signal to level compressor 14 can be constructed of a very simple circuit. For example they can be constructed of a very simple grounded-emitter transistor circuit. Alternatively, they can be constructed of a very simple grounded-source transistor circuit. Further alternatively, they may be constructed of a diode circuit.

Figure 9:
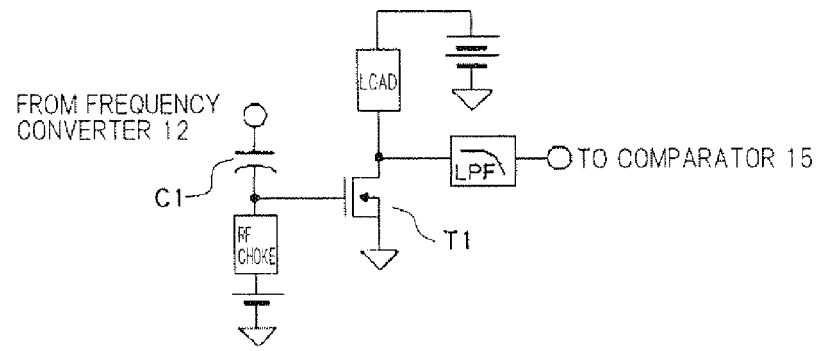
FIG. 9 is a diagram showing an example of the circuit of amplitude detector 13 and level compressor 14.

FIG. 9 is a diagram showing an example of the circuit of amplitude detector 13 and level compressor 14. FIG. 9 shows a grounded-emitter field-effect transistor circuit. The RF signal from frequency converter 12 has its DC component removed by capacitor C1. Grounded-source transistor T1 is biased so that gain $G_{IF}$ has a peak in the vicinity of input level G'×A. The combined circuit shown in FIG. 9 performs detection (amplitude detection) and level compression based on the nonlinearity of the circuit.

Figure 10:
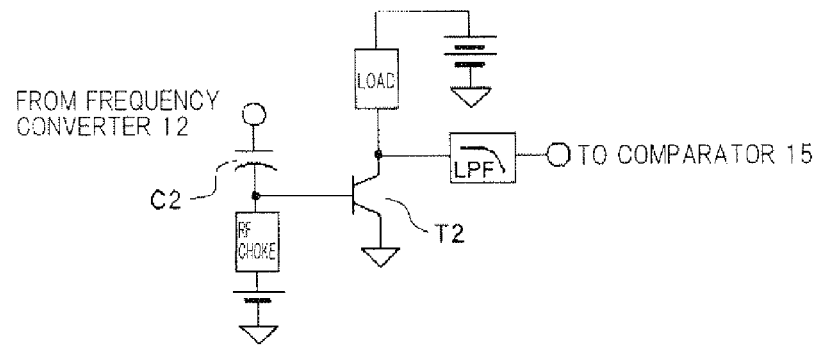
FIG. 10 is a diagram showing another example of the circuit of amplitude detector 13 and level compressor 14.

FIG. 10 is a diagram showing another example of the circuit of amplitude detector 13 and level compressor 14. FIG. 10 shows a grounded-source bipolar transistor circuit. The RF signal from frequency converter 12 has its DC component removed by capacitor C2. Grounded-emitter transistor T2 is biased so that gain $G_{IF}$ has a peak in the vicinity of input level G'×A. The circuit shown in FIG. 10 performs detection and level compression based on the nonlinearity of the circuit.

Figure 11:
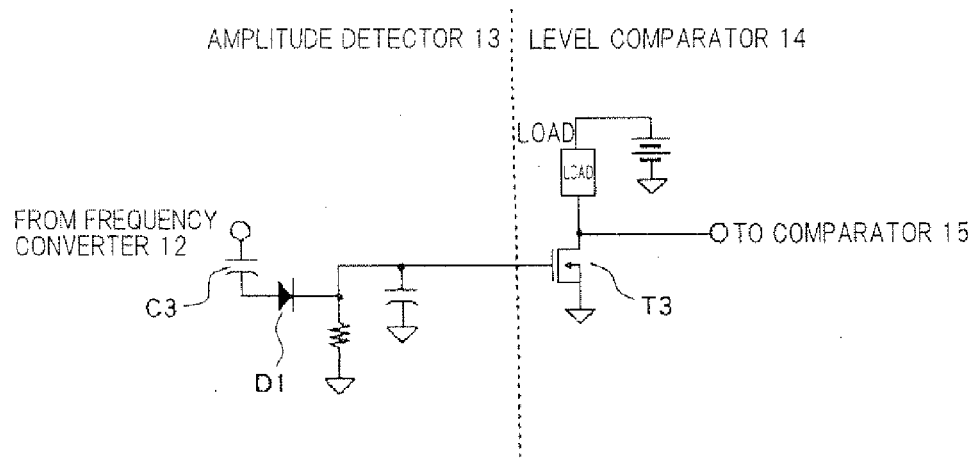
FIG. 11 is a diagram showing still another example of the circuit of amplitude detector 13 and level compressor 14.

FIG. 11 is a diagram showing still another example of the circuit of amplitude detector 13 and level compressor 14. FIG. 11 shows a diode circuit. The RF signal from frequency converter 12 has its DC component removed by capacitor C3 and is detected by a detecting circuit comprising diode D1. Grounded-source transistor T3 is biased so that gain $G_{IF}$ has a peak in the vicinity of input level G'×A. The transistor circuit performs level compression based on the nonlinearity of the circuit.

Comparator 15 compares the positive and negative signals which have been compressed in level by level compressor 14. Based on the compared result, offset adjuster 10 generates a DC offset signal for equalizing the amplitudes of the positive and negative signals, and supplies the DC offset signal to signal generator 11. At this time, if the level signal of the positive signal output from level compressor 14 is higher in level than the level signal of the negative signal output from the level compressor 14, then offset adjuster 10 corrects the offset in a negative direction. Conversely, if the level signal of the positive signal output from level compressor 14 is lower in level than the level signal of the negative signal output from the level compressor 14, then offset adjuster 10 corrects the offset in a positive direction.

According to these circuits, level compressor 14 converts the level with a gain that changes depending on the input level, and comparator 15 compares the amplitudes of the positive and negative signals that have been converted in level. Consequently, when comparator 15 operates to compare the amplitudes for DC offset correction where the required accuracy differs depending on the input level, it is possible to correct a DC offset with an appropriate accuracy level without the need for a circuit which is large in scale and power consumption.

Gain $G_{IF}$ can be increased in the region where comparator 15 is required to have high accuracy and the remaining offsets are small, and gain $G_{IF}$ can be reduced in the region where comparator 15 is not required to have so much accuracy and the remaining offsets are large with the circuit tending to become saturated. Therefore, it is possible to correct a DC offset with a high accuracy level without the need for a circuit which is large in scale and power consumption.

Figure 12:
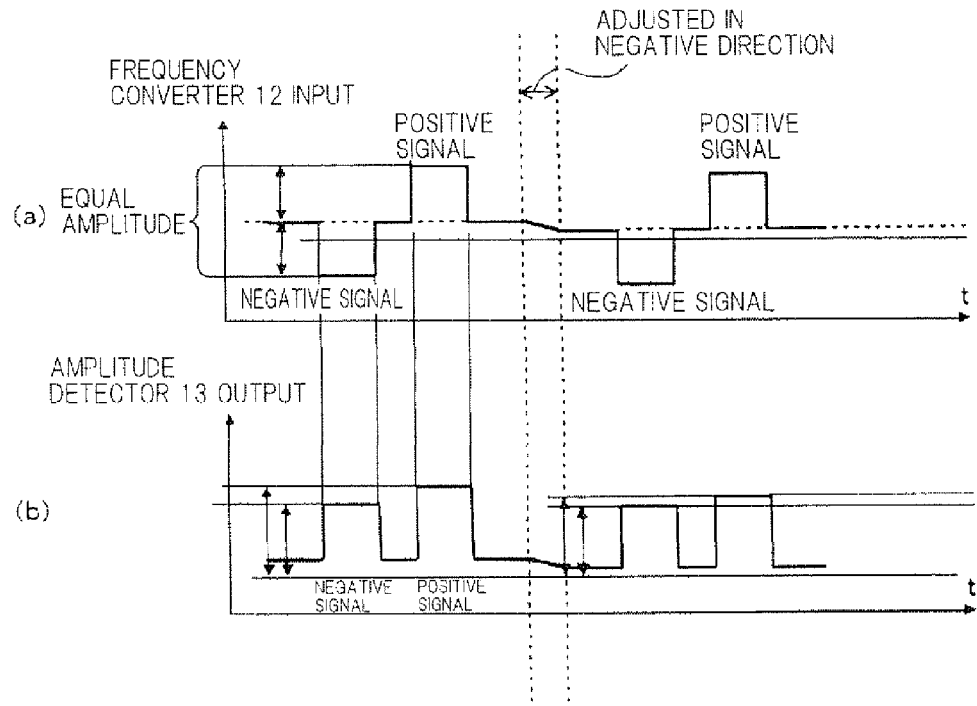
FIG. 12 is a diagram illustrative of the manner in which the DC offset correcting device operates to correct a DC in a negative direction.

FIG. 12 is a diagram illustrative of the manner in which the DC offset correcting device operates to correct a DC in a negative direction. FIG. 12 shows in (a) a test signal input from signal generator 11 to frequency converter 12 and also shows in (b) a level signal input from amplitude detector 13 to level compressor 14.

If a positive DC offset is present as shown in (a), the level signal of the positive signal is higher than the level signal of the negative signal as shown in (b). Therefore, offset adjuster 16 adjusts the DC offset of signal generator 11 in the negative direction. The DC offset is reduced, as shown in Fig. (a), and the level difference between the level signal of the positive signal and the level signal of the negative signal is reduced as shown in (b).

Figure 13:
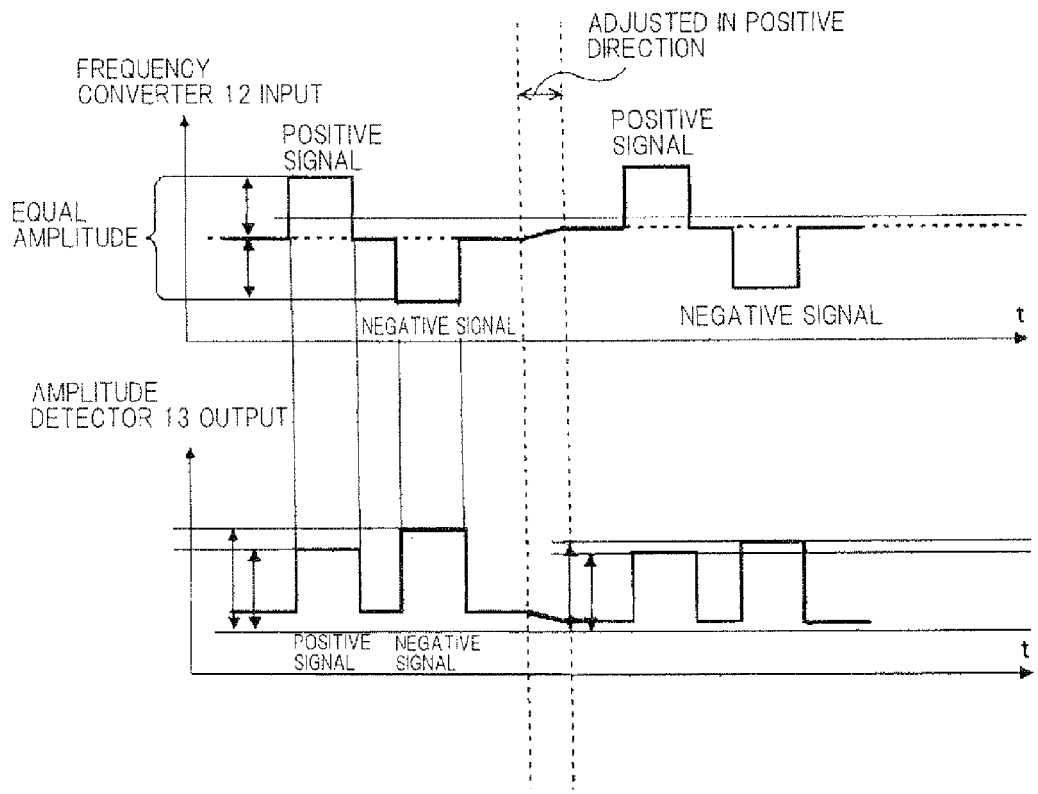
FIG. 13 is a diagram illustrative of the manner in which the DC offset correcting device operates to correct a DC in a positive direction.

FIG. 13 is a diagram illustrative of the manner in which the DC offset correcting device operates to correct a DC in a positive direction. FIG. 13 shows in (a) a test signal input from signal generator 11 to frequency converter 12 and also shows in (b) a level signal input from amplitude detector 13 to level compressor 14.

If a negative DC offset is present as shown in (a), the level signal of the positive signal is lower than the level signal of the negative signal as shown in (b). Therefore, offset adjuster 16 adjusts the DC offset of signal generator 11 in the positive direction. The DC offset is reduced, as shown in Fig. (a), and the level difference between the level signal of the positive signal and the level signal of the negative signal is reduced as shown in (b).

Figure 14:
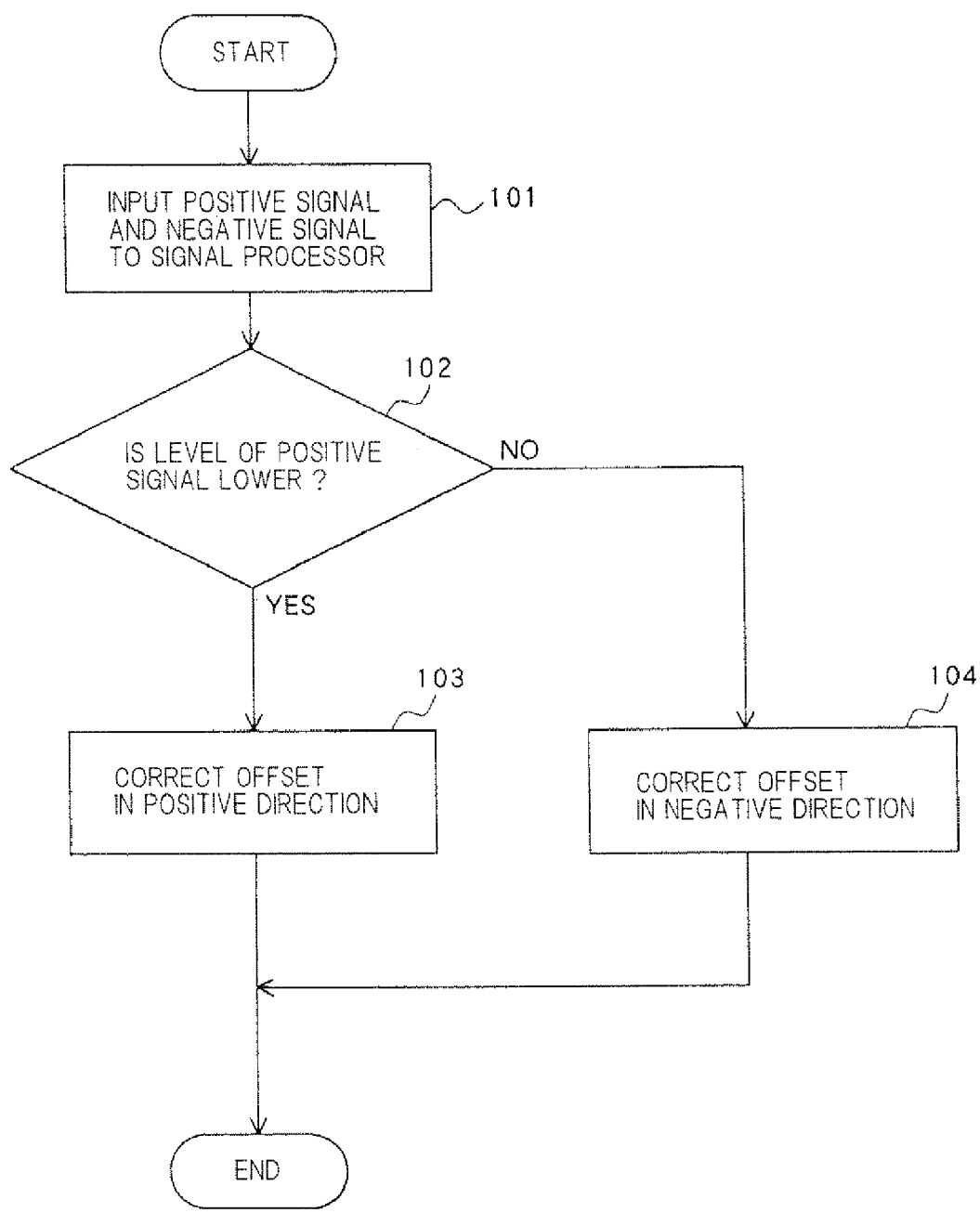
FIG. 14 is a flowchart showing an example of the operation sequence of the DC offset correcting device according to the present exemplary embodiment for DC offset correction.

FIG. 14 is a flowchart showing an example of the operation sequence of the DC offset correcting device according to the present exemplary embodiment for DC offset correction. As shown in FIG. 14, the DC offset correcting device inputs a test signal including a positive signal and a negative signal to the signal processor (frequency converter 12) (step 101). Then, comparator 15 determines whether the level signal representative of the amplitude of the positive signal is lower than the level signal representative of the amplitude of the negative signal or not (step 102).

If the level signal representative of the amplitude of the positive signal is lower than the level signal representative of the amplitude of the negative signal, then offset adjuster 16 corrects the offset of signal generator 11 in the positive direction (step 103). If the level signal representative of the amplitude of the positive signal is not lower than the level signal representative of the amplitude of the negative signal, then offset adjuster 16 corrects the offset of signal generator 11 in the negative direction (step 104).

Figure 15:
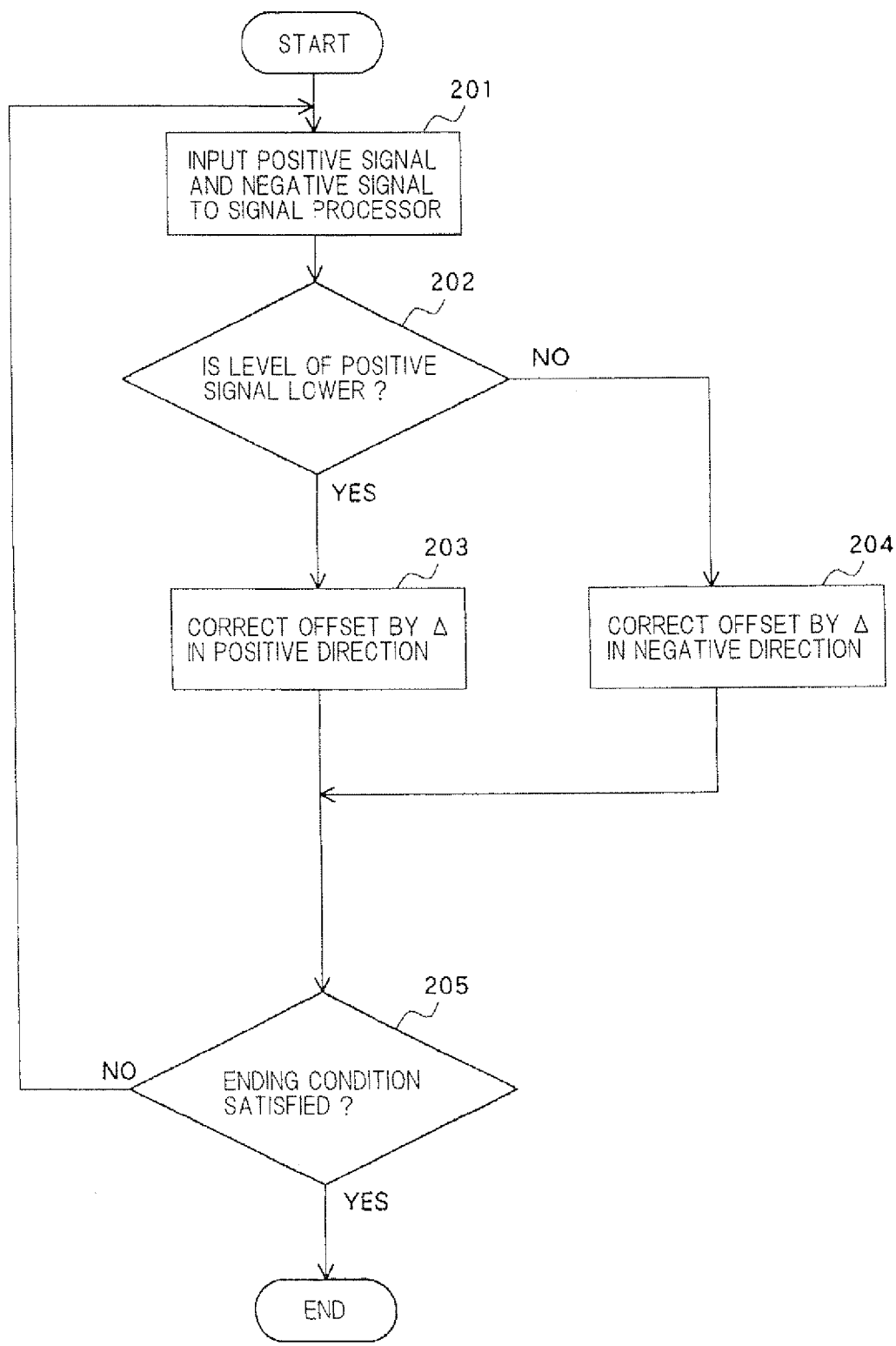
FIG. 15 is a flowchart showing another example of the operation sequence of the DC offset correcting device according to the present exemplary embodiment for DC offset correction.

FIG. 15 is a flowchart showing another example of the operation sequence of the DC offset correcting device according to the present exemplary embodiment for DC offset correction. In this example, the offset is corrected by constant corrective value A. As shown in FIG. 15, the DC offset correcting device inputs a test signal including a positive signal and a negative signal to the signal processor (frequency converter 12) (step 201). Then, comparator 15 determines whether the level signal representative of the amplitude of the positive signal is lower than the level signal representative of the amplitude of the negative signal or not (step 202).

If the level signal representative of the amplitude of the positive signal is lower than the level signal representative of the amplitude of the negative signal, then offset adjuster 16 corrects the offset of signal generator 11 by corrective value $\Delta$ in the positive direction (step 203). If the level signal representative of the amplitude of the positive signal is not lower than the level signal representative of the amplitude of the negative signal, then offset adjuster 16 corrects the offset of signal generator 11 by corrective value $\Delta$ in the negative direction (step 204).

Then, the DC offset correcting device determines whether a given ending condition is satisfied or not (step 205). If the ending condition is satisfied, then the DC offset correcting device ends its processing sequence. If the ending condition is not satisfied, then control goes back to step 201 to repeat the correcting process. For example, the ending condition may be satisfied when the correcting process is repeated a predetermined number of times.

As shown in FIG. 15, the DC offset can finally be corrected with high accuracy when offset adjuster 16 repeats the correction of the offset in signal generator 11.

Figure 16:
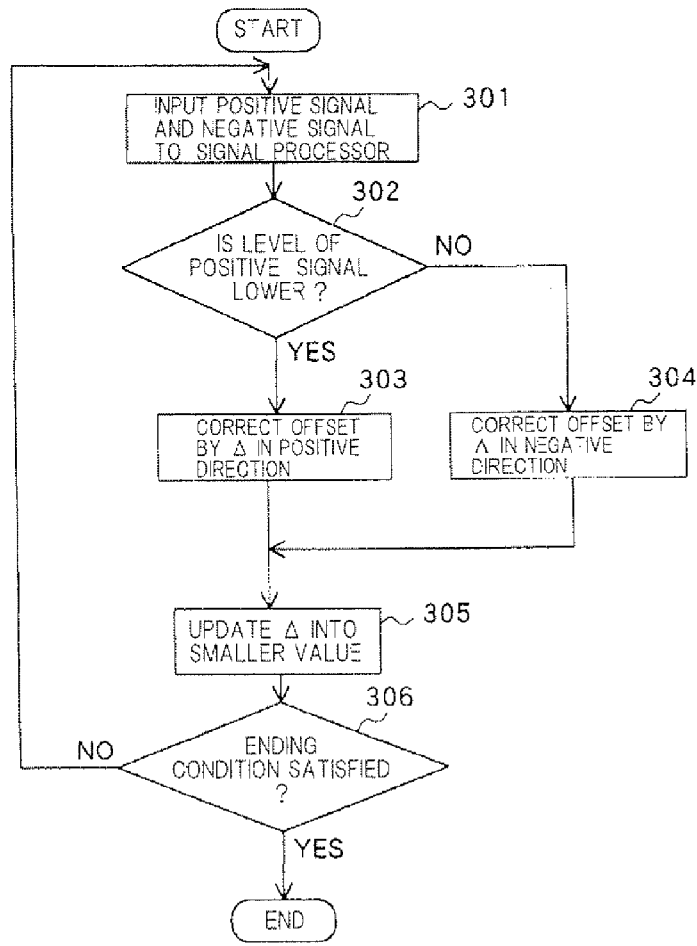
FIG. 16 is a flowchart showing still another example of the operation sequence of the DC offset correcting device according to the present exemplary embodiment for DC offset correction.

FIG. 16 is a flowchart showing still another example of the operation sequence of the DC offset correcting device according to the present exemplary embodiment for DC offset correction. In this example, corrective value $\Delta$ is progressively reduced. As shown in FIG. 16, the DC offset correcting device inputs a test signal including a positive signal and a negative signal to the signal processor (frequency converter 12) (step 301). Then, comparator 15 determines whether the level signal representative of the amplitude of the positive signal is lower than the level signal representative of the amplitude of the negative signal or not (step 302).

If the level signal representative of the amplitude of the positive signal is lower than the level signal representative of the amplitude of the negative signal, then offset adjuster 16 corrects the offset of signal generator 11 by corrective value $\Delta$ in the positive direction (step 303). If the level signal representative of the amplitude of the positive signal is not lower than the level signal representative of the amplitude of the negative signal, then offset adjuster 16 corrects the offset of signal generator 11 by corrective value $\Delta$ in the negative direction (step 304).

After step 303 or step 304, the DC offset correcting device updates corrective value $\Delta$ into a smaller value (step 305). For example, corrective value $\Delta$ may be set to ½ of the preceding value.

Then, the DC offset correcting device determines whether a given ending condition is satisfied or not (step 306). If the ending condition is satisfied, then the DC offset correcting device ends its processing sequence. If the ending condition is not satisfied, then control goes back to step 301 to repeat the correcting process. For example, the ending condition may be satisfied when the correcting process is repeated a predetermined number of times. Alternatively, the ending condition may be satisfied when corrective value $\Delta$ reaches a certain value or less.

As shown in FIG. 16, the DC offset can finally be corrected with high accuracy when offset adjuster 16 repeats the correction of the offset in signal generator 11 while corrective value $\Delta$ is being progressively reduced.

Figure 17:
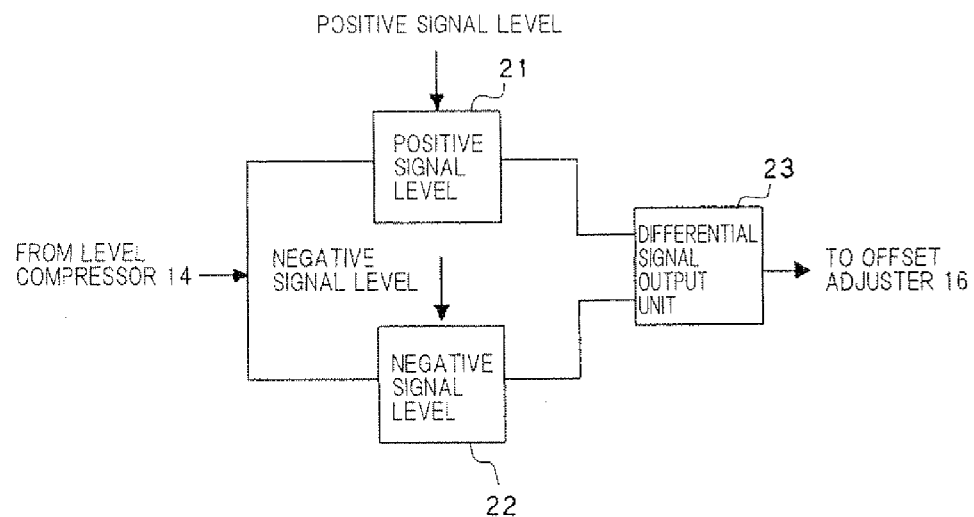
FIG. 17 is a block diagram showing an example of the arrangement of comparator 15.

FIG. 17 is a block diagram showing an example of the arrangement of comparator 15. As shown in FIG. 17, comparator 15 comprises positive signal level holder 21, negative signal level holder 22, and differential signal output unit 23.

Positive signal level holder 21 holds the level of the positive signal depending on a positive signal trigger indicative of the timing of the positive signal. Negative signal level holder 22 holds the level of the negative signal depending on a negative signal trigger indicative of the timing of the negative signal. Difference signal output unit 23 generates a signal representing the difference between the level of the positive signal held by positive signal level holder 21 and the level of the negative signal held by negative signal level holder 22. It can be recognized which one of the level of the positive signal and the level of the negative signal is greater based on the polarity of the signal representing the difference. Difference signal output unit 23 may comprise an operational amplifier.

Figure 18:
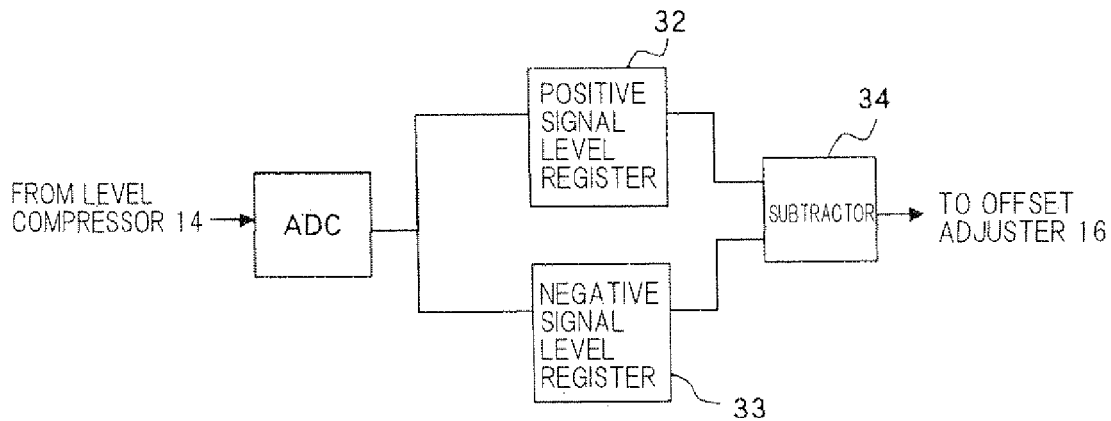
FIG. 18 is a block diagram showing another example of the arrangement of comparator 15.

FIG. 18 is a block diagram showing another example of the arrangement of comparator 15. As shown in FIG. 18, comparator 15 comprises analog-to-digital converter (ADC) 31, positive signal level register 32, negative signal level register 337 and subtractor 34.

ADC 31 converts the signal from level compressor 14 into a digital signal. Positive signal level register 32 holds the level of the positive signal output from ADC 31. Negative signal level register 33 holds the level of the negative signal output from ADC 31. Subtractor 34 subtracts the value held by negative signal level register 33 from the value held by positive signal level register 32. Alternatively, subtractor 34 may subtract the value held by positive signal level register 32 from the value held by negative signal level register 33. It can be recognized which one of the level of the positive signal and the level of the negative signal is greater based on the polarity of the difference. Though subtractor 34 is shown, the level difference representing which one of the level of the positive signal and the level of the negative signal is greater may not necessarily be required. A comparator may be used instead of subtractor 34 for determining which one of the level of the positive signal and the level of the negative signal is greater. With such a comparator, comparator 15 and offset adjuster 16 may be constructed of a simple arrangement.

Figure 19:
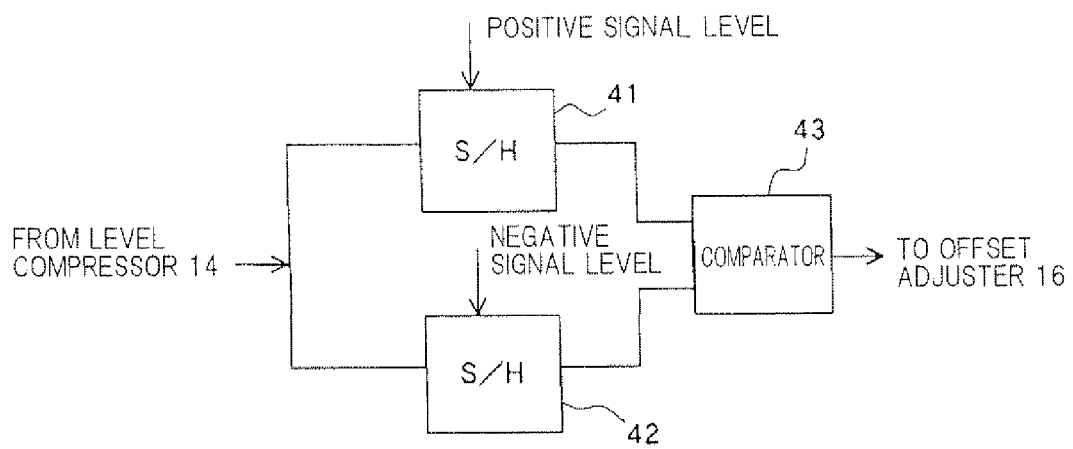
FIG. 19 is a block diagram showing still another example of the arrangement of comparator 15.

FIG. 19 is a block diagram showing still another example of the arrangement of comparator 15. As shown in FIG. 19, comparator 15 comprises sample and hold circuits (S/H) 41, 42 and comparator 43.

S/H 41 holds the level of the positive signal depending on a positive signal trigger indicative of the timing of the detected amplitude of the positive signal. S/H 42 holds the level of the negative signal depending on a negative signal trigger indicative of the timing of the detected amplitude of the negative signal. Comparator 43 compares the level held by S/H 42 and the level held by S/H 42 with each other.

Figure 20:
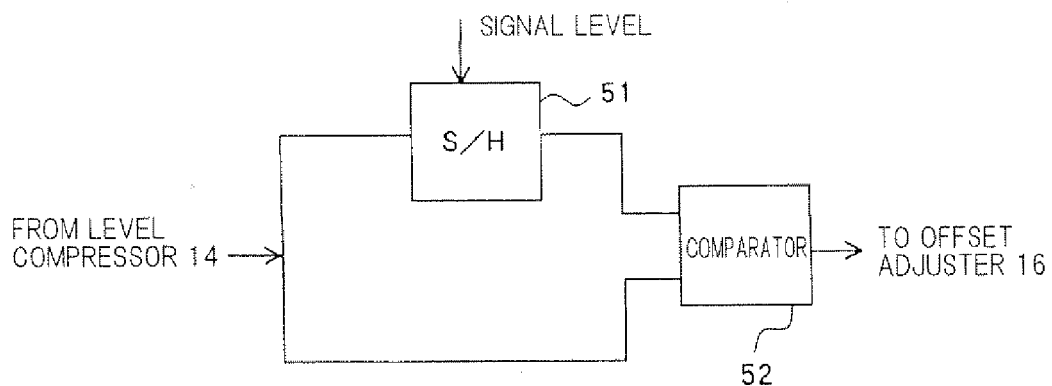
FIG. 20 is a block diagram showing yet another example of the arrangement of comparator 15.

FIG. 20 is a block diagram showing yet another example of the arrangement of comparator 15. In this example, one of the S/Hs of the arrangement shown in FIG. 19 is omitted. As shown in FIG. 20, comparator 15 comprises S/H 51 and comparator 52.

S/H 51 holds the level of the positive signal depending on a positive signal trigger indicative of the timing of the positive signal. Since the positive and negative signals appear in a time sequence, comparator 52 compares the level of the positive signal held by S/H 51 and the level of the negative signal with each other at the timing when the level of the negative signal appears. The positive signal and the negative signal may be switched around.

With the arrangement shown in FIG. 19 or 20, comparator 15 can simply be constructed of a sample and hold circuit or circuits and a comparator.

If the amplitudes of the positive and negative signals of the test signal contain errors, then the errors will adversely affect the DC offset correction.

Figure 21:
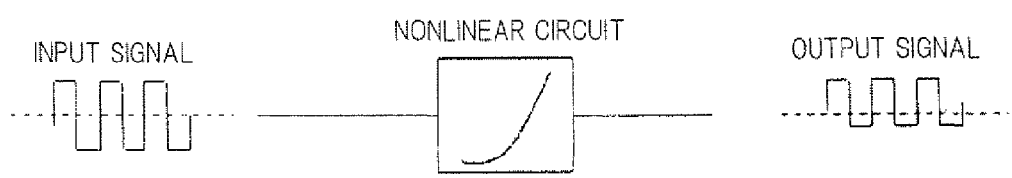
FIG. 21 is a diagram illustrative of an example of a differential circuit for canceling nonlinearity.
Figure 21:
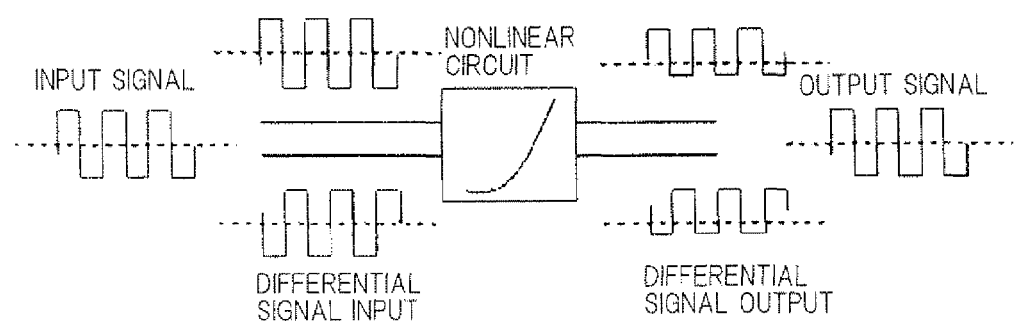

FIG. 21 is a diagram illustrative of an example of a differential circuit for canceling nonlinearity. If a signal having a constant amplitude from a reference level is input to a nonlinear circuit as shown in FIG. 21(a), then positive and negative signals have different amplitudes at the output terminal due to the nonlinearity of the circuit. If signal generator 11 is nonlinear, then the positive and negative signals of the test signal have different amplitudes, resulting in a reduction in the accuracy of the DC offset correction. If the nonlinear circuit comprises a differential circuit, then the errors of the amplitudes of the positive and negative signals due to the nonlinearity cancel each other. As a result, the amplitudes of the positive and negative signals are equalized to increase the accuracy of the DC offset correction. If signal generator 11 of the DC offset correcting device according to the present exemplary embodiment comprises a differential circuit, then the transmitter will provide good communication quality.

Various inventive examples of the present exemplary embodiment will be described below.

1st INVENTIVE EXAMPLE

In a DC offset correcting device according to a first inventive example, amplitude detector 13 and level compressor 14 shown in FIG. 4 comprise the grounded-source transistor circuit shown in FIG. 9. The circuit shown in FIG. 9 removes the DC component from the RF signal from frequency converter 12 with capacitor C1. In the circuit shown in FIG. 9, transistor T1 is biased by an RF choke comprising a resistor, an inductor, etc.

The bias point is set such that when the positive or negative signal of the test signal free of a DC offset is input to frequency converter 12, gain $G_{IF}$ with respect to the amplitude of the signal output from frequency converter 12 is of a large value.

As shown in FIG. 7, level compressor 14 according to the present inventive example has peak input level 1 such that gain $G_{IF}$ decreases monotonously with respect to an input level greater than a certain value. If the level of the signal that is input to level compressor 14 when the test signal free of a DC offset is input to frequency converter 12 is input level 2, then, as shown in FIG. 8, input level 2 is set in a range from 50% to 150% of input level 1. Input level 2 is thus set by adjusting the level of the test signal or adjusting the bias of the MOS transistor.

With the arrangement of amplitude detector 13 and level compressor 14 according to the present inventive example, the test signal can be compared highly accurately by a simple arrangement without the need for a circuit which is large in scale and power consumption, such as VGA. As a result, a DC offset of the transmitter can be adjusted by an arrangement which is small in scale and low in power consumption.

2nd INVENTIVE EXAMPLE

In a DC offset correcting device according to a second inventive example, amplitude detector 13 and level compressor 14 shown in FIG. 4 comprise the grounded-emitter transistor circuit shown in FIG. 10. The circuit shown in FIG. 10 removes the DC component from the RF signal from frequency converter 12 with capacitor C2. In the circuit shown in FIG. 10, transistor T2 is biased by an RF choke comprising a resistor, an inductor, etc.

The bias point is set such that when the positive or negative signal of the test signal free of a DC offset is input to frequency converter 12, gain $G_{IF}$ is of a large value with respect to the amplitude of the signal output from frequency converter 12.

As shown in FIG. 7, level compressor 14 according to the present inventive example has peak input level 1 such that gain $G_{IF}$ decreases monotonously with respect to an input level greater than a certain value. If the level of the signal that is input to level compressor 14 when the test signal free of a DC offset is input to frequency converter 12 is input level 2, then, as shown in FIG. 8, input level 2 is set in a range from 50% to 150% of input level 1. Input level 2 is thus set by adjusting the level of the test signal or adjusting the bias of the bipolar transistor.

With the arrangement of amplitude detector 13 and level compressor 14 according to the present inventive example, the test signal can be compared highly accurately by a simple arrangement without the need for a circuit which is large in scale and power consumption, such as VGA. As a result, a DC offset of the transmitter can be adjusted by an arrangement which is small in scale and low in power consumption.

3rd INVENTIVE EXAMPLE

In a DC offset correcting device according to a third inventive example, amplitude detector 13 and level compressor 14 shown in FIG. 4 comprise the circuit shown in FIG. 11. In FIG. 11, amplitude detector 13 comprises a diode circuit, and level compressor 14 comprises a grounded-source transistor circuit.

In amplitude detector 13 according to the present inventive example, diode D1 detects the RF signal and supplies the detected level signal to level compressor 14. Level compressor 14 has its gain $G_{IF}$ set such that when the positive or negative signal of the test signal free of a DC offset is input to frequency converter 12, gain $G_{IF}$ has a large value with respect to the amplitude of the RF signal output from frequency converter 12.

As shown in FIG. 7, level compressor 14 according to the present inventive example has peak input level 1 such that gain $G_{IF}$ decreases monotonously with respect to an input level greater than a certain value. If the level of the signal that is input to level compressor 14 when the test signal free of a DC offset is input to frequency converter 12 is input level 2, then, as shown in FIG. 8, input level 2 is set in a range from 50% to 150% of input level 1. Input level 2 is thus set by adjusting the level of the test signal or adjusting the bias of the MOS transistor, With the arrangement of amplitude detector 13 and level compressor 14 according to the present inventive example, the test signal can be compared highly accurately by a simple arrangement without the need for a circuit which is large in scale and power consumption, such as VGA. As a result, a DC offset of the transmitter can be adjusted by an arrangement which is small in scale and low in power consumption.

Figure 22:
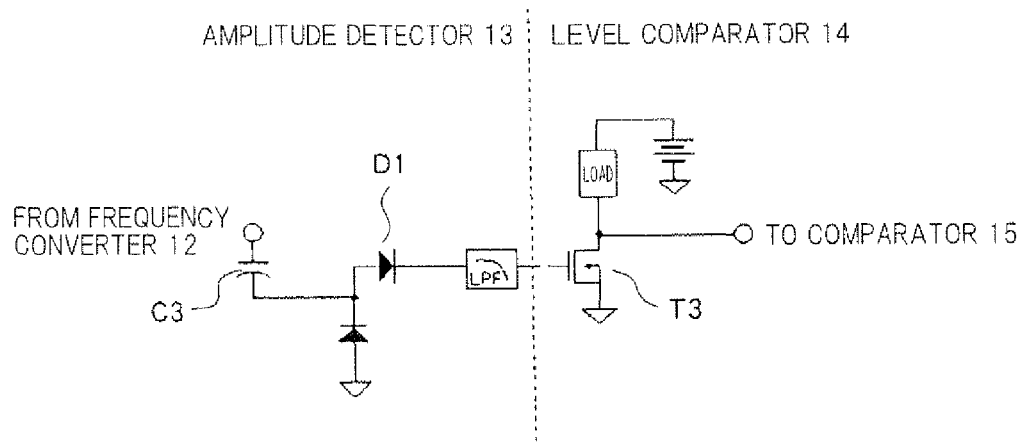
FIG. 22 is a diagram showing another example of the circuit of amplitude detector 13 and level compressor 14.

While the arrangement of FIG. 11 is illustrated, the arrangement of FIG. 22 is also applicable as another example.

4th INVENTIVE EXAMPLE

Figure 23:
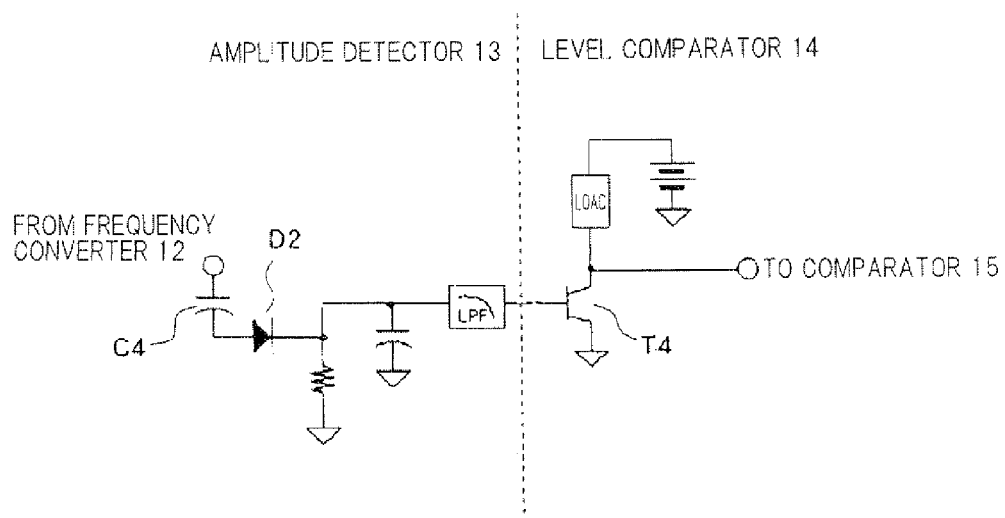
FIG. 23 is a diagram showing still another example of the circuit of amplitude detector 13 and level compressor 14.

In a DC offset correcting device according to a fourth inventive example, amplitude detector 13 and level compressor 14 shown in FIG. 4 comprise the circuit shown in FIG. 23. In FIG. 23, amplitude detector 13 comprises a diode circuit, and level compressor 14 comprises a grounded-emitter transistor circuit.

In amplitude detector 13 according to the present inventive example, diode D2 detects the RF signal and supplies the detected level signal to level compressor 14. Level compressor 14 has its gain $G_{IF}$ set such that when the positive or negative signal of the test signal free of a DC offset is input to frequency converter 12, gain $G_{IF}$ has a large value with respect to the amplitude of the RF signal output from frequency converter 12.

As shown in FIG. 7, level compressor 14 according to the present inventive example has peak input level 1 such that gain $G_{IF}$ decreases monotonously with respect to an input level greater than a certain value. If the level of the signal that is input to level compressor 14 when the test signal free of a DC offset is input to frequency converter 12 is input level 2, then, as shown in FIG. 8, input level 2 is set in a range from 50% to 150% of input level 1. Input level 2 is thus set by adjusting the level of the test signal or adjusting the bias of the bipolar transistor.

With the arrangement of amplitude detector 13 and level compressor 14 according to the present inventive example, the test signal can be compared highly accurately by a simple arrangement without the need for a circuit which is large in scale and power consumption, such as VGA. As a result, a DC offset of the transmitter can be adjusted by an arrangement which is small in scale and low in power consumption.

While the arrangement of FIG. 22 is illustrated, the arrangement of FIG. 23 is also applicable as another example.

5th INVENTIVE EXAMPLE

In a DC offset correcting device according to a fifth inventive example, amplitude detector 13 and level compressor 14 shown in FIG. 4 comprise the grounded-source transistor circuit shown in FIG. 9. The circuit shown in FIG. 9 removes the DC component from the RF signal from frequency converter 12 with capacitor C1. In the circuit shown in FIG. 9, transistor T1 is biased by an RF choke comprising a resistor, an inductor, etc.

The bias point is set such that when the positive or negative signal of the test signal free of a DC offset is input to frequency converter 12, gain $G_{IF}$ is of a large value with respect to the amplitude of the signal output from frequency converter 12.

Figure 25:
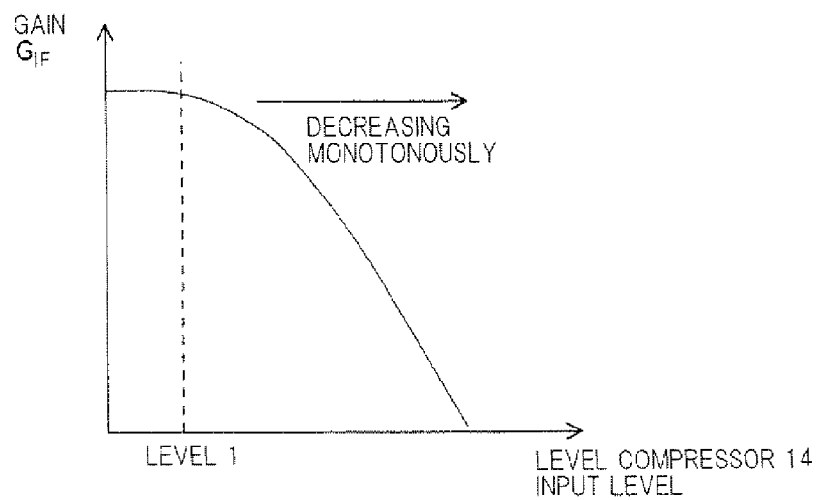
FIG. 25 is a graph showing another example of the relationship between an input to level compressor 14 and gain $G_{IF}$.

As shown in FIG. 25, level compressor 14 according to the present inventive example has input level 1 at a point where gain $G_{IF}$ starts to change, such that gain $G_{IF}$ decreases monotonously with respect to an input level greater than a certain value. If the level of the signal that is input to level compressor 14 when the test signal free of a DC offset is input to frequency converter 12 is input level 2, then, as shown in FIG. 25, input level 2 is set in a range from 50% to 150% of input level 1. Input level 2 is thus set by adjusting the level of the test signal or adjusting the bias of the MOS transistor.

In this example, the level greater than input level 2 is compressed thereby to compress the input level that contributes greatly to the saturation of the circuit following level compressor 14.

With the arrangement of amplitude detector 13 and level compressor 14 according to the present inventive example, the test signal can be compared highly accurately by a simple arrangement without the need for a circuit which is large in scale and power consumption, such as VGA. As a result, a DC offset of the transmitter can be adjusted by an arrangement which is small in scale and low in power consumption.

While the arrangement of FIG. 9 is illustrated, the arrangement of FIG. 10 is also applicable as another example.

6th INVENTIVE EXAMPLE

In a DC offset correcting device according to a sixth inventive example, amplitude detector 13 and level compressor 14 shown in FIG. 4 comprise the circuit shown in FIG. 11. In FIG. 11, amplitude detector 13 comprises a diode circuit, and level compressor 14 comprises a grounded-source transistor circuit.

In amplitude detector 13 according to the present inventive example, diode D1 detects the RF signal and supplies the detected level signal to level compressor 14. Level compressor 14 has its gain $G_{IF}$ set such that when the positive or negative signal of the test signal free of a DC offset is input to frequency converter 12, gain $G_{IF}$ has a large value with respect to the amplitude of the RF signal output from frequency converter 12.

Figure 26:
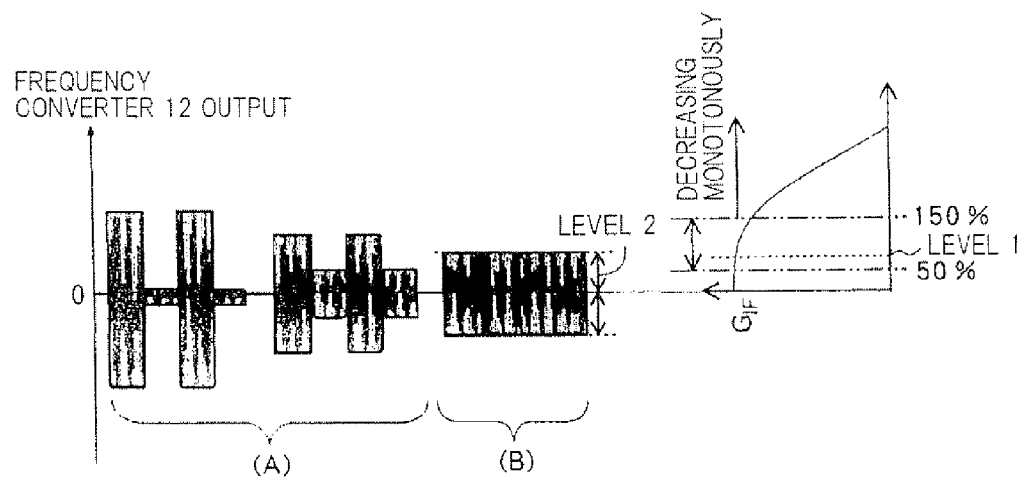
FIG. 26 is a diagram illustrative of the relationship between an output signal of frequency converter 12 and gain $G_{IF}$ characteristics.

As shown in FIG. 25, level compressor 14 according to the present inventive example has peak input level 1 at a point where gain $G_{IF}$ starts to change, such that gain $G_{IF}$ decreases monotonously with respect to an input level greater than a certain value. If the level of the signal that is input to level compressor 14 when the test signal free of a DC offset is input to frequency converter 12 is input level 2, then, as shown in FIG. 26, input level 2 is set in a range from 50% to 150% of input level 1. Input level 2 is thus set by adjusting the level of the test signal or adjusting the bias of the bipolar transistor.

In this example, the level greater than input level 2 is compressed thereby to compress the input level that contributes greatly to the saturation of the circuit following level compressor 14.

With the arrangement of amplitude detector 13 and level compressor 14 according to the present inventive example, the test signal can be compared highly accurately by a simple arrangement without the need for a circuit which is large in scale and power consumption, such as VGA. As a result, a DC offset of the transmitter can be adjusted by an arrangement which is small in scale and low in power consumption.

While the arrangement of FIG. 11 is illustrated, the arrangement of FIG. 22 is also applicable as another example.

7th INVENTIVE EXAMPLE

In a DC offset correcting device according to a seventh inventive example, amplitude detector 13 and level compressor 14 shown in FIG. 4 comprise the circuit shown in FIG. 23. In FIG. 23, amplitude detector 13 comprises a diode circuit, and level compressor 14 comprises a grounded-emitter transistor circuit.

In amplitude detector 13 according to the present inventive example, diode D2 detects the RF signal and supplies the detected level signal to level compressor 14. Level compressor 14 has its gain $G_{IF}$ set such that when the positive or negative signal of the test signal free of a DC offset is input to frequency converter 12, gain $G_{IF}$ has a large value with respect to the amplitude of the RF signal output from frequency converter 12.

As shown in FIG. 25, level compressor 14 according to the present inventive example has peak input level 1 at a point where gain $G_{IF}$ starts to change, such that gain $G_{IF}$ decreases monotonously with respect to an input level greater than a certain value. If the level of the signal that is input to level compressor 14 when the test signal free of a DC offset is input to frequency converter 12 is input level 2, then, as shown in FIG. 26, input level 2 is set in a range from 50% to 150% of input level 1. Input level 2 is thus set by adjusting the level of the test signal or adjusting the bias of the bipolar transistor.

In this example, the level greater than input level 2 is compressed thereby to compress the input level that contributes greatly to the saturation of the circuit following level compressor 14.

With the arrangement of amplitude detector 13 and level compressor 14 according to the present inventive example, the test signal can be compared highly accurately by a simple arrangement without the need for a circuit which is large in scale and power consumption, such as VGA. As a result, a DC offset of the transmitter can be adjusted by an arrangement which is small in scale and low in power consumption.

Figure 24:
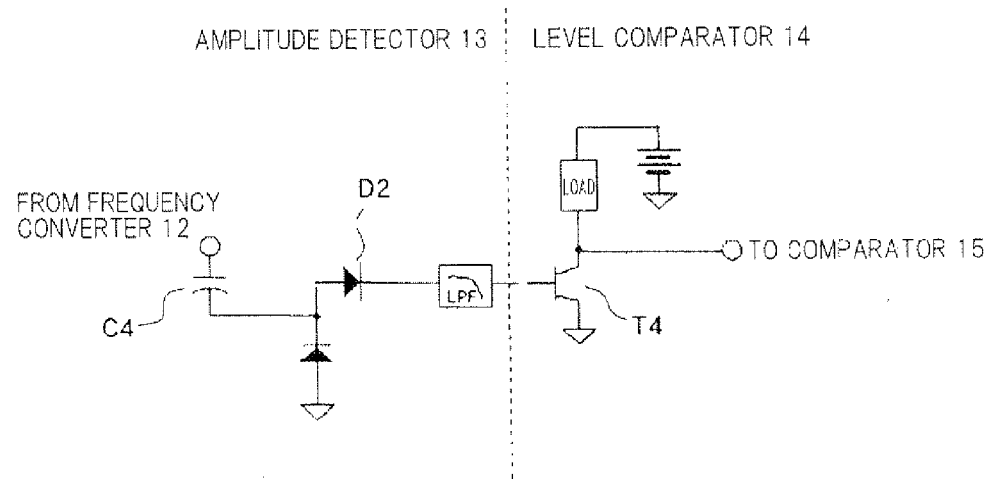
FIG. 24 is a diagram showing yet another example of the circuit of amplitude detector 13 and level compressor 14.

While the arrangement of FIG. 23 is illustrated, the arrangement of FIG. 24 is also applicable as another example.

8th INVENTIVE EXAMPLE

In a DC offset correcting device according to an eighth inventive example, amplitude detector 13 and level compressor 14 shown in FIG. 4 comprise the grounded-source transistor circuit shown in FIG. 9. The circuit shown in FIG. 9 removes the DC component from the RF signal from frequency converter 12 with capacitor C1. In the circuit shown in FIG. 9, transistor T1 is biased by an RF choke comprising a resistor, an inductor etc.

Figure 27:
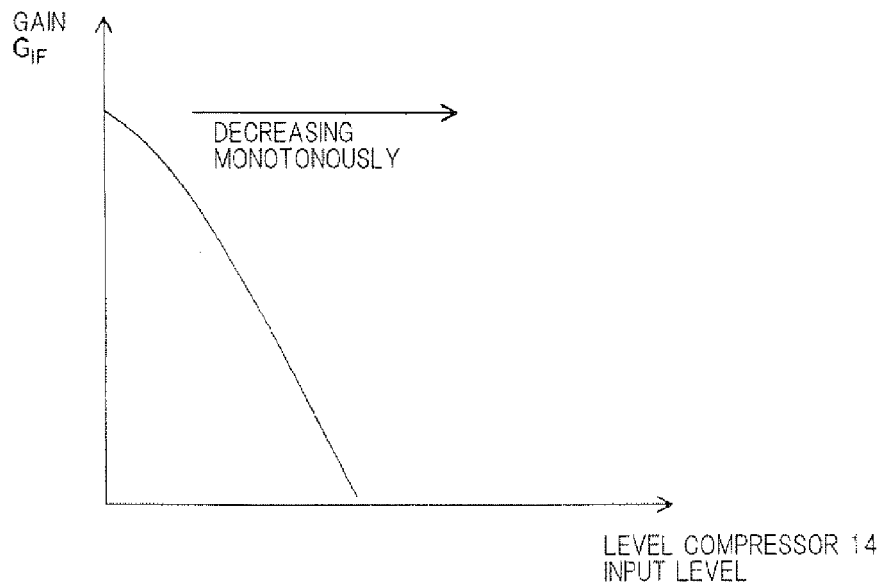
FIG. 27 is a graph showing still another example of the relationship between an input to level compressor 14 and gain $G_{IF}$.
Figure 28:
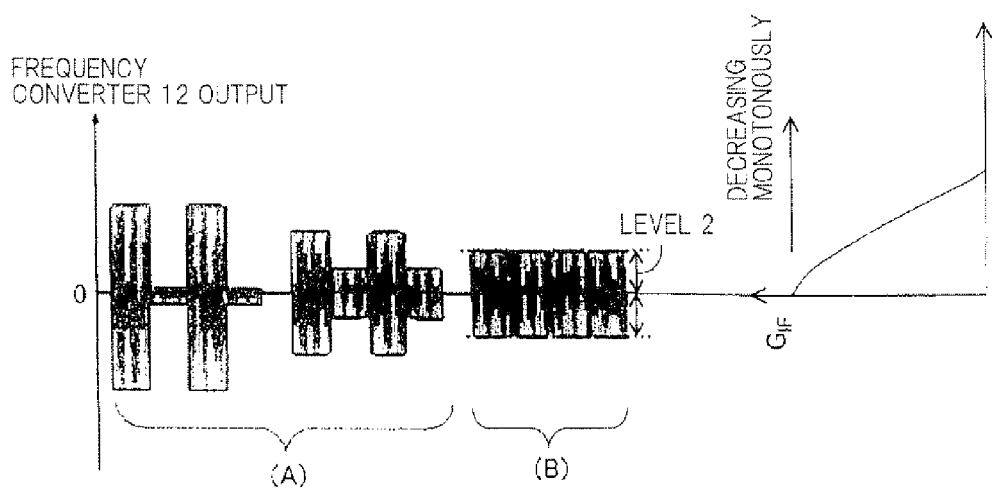
FIG. 28 is a diagram illustrative of the relationship between an output signal of frequency converter 12 and gain $G_{IF}$ characteristics.

The bias point is set such that gain $G_{IF}$ is smaller as the amplitude of the RF signal output from frequency converter 12 is greater, as shown in FIG. 27. If the level of the signal that is input to level compressor 14 when the test signal free of a DC offset is input to frequency converter 12 is input level 2, then, as shown in FIG. 28, the gain with respect input levels lower than input level 2 is greater than a minimum required. The level compression is performed by lowering the level at the time the input level that contributes finally to the saturation is large.

With the arrangement of amplitude detector 13 and level compressor 14 according to the present inventive example, the test signal can be compared highly accurately by a simple arrangement without the need for a circuit which is large in scale and power consumption, such as VGA. As a result, a DC offset of the transmitter can be adjusted by an arrangement which is small in scale and low in power consumption.

While the arrangement of FIG. 9 is illustrated, the arrangement of FIG. 10 is also applicable as another example.

9th INVENTIVE EXAMPLE

In a DC offset correcting device according to a ninth inventive example, amplitude detector 13 and level compressor 14 shown in FIG. 4 comprise the circuit shown in FIG. 11. In FIG. 11, amplitude detector 13 comprises a diode circuit, and level compressor 14 comprises a grounded-source transistor circuit.

In amplitude detector 13 according to the present inventive example, diode D1 detects the RF signal and supplies the detected level signal to level compressor 14. The bias point of transistor T1 of level compressor 14 is set such that gain $G_{IF}$ is smaller as the amplitude of the RF signal output from frequency converter 12 is greater, as shown in FIG. 27. If the level of the signal that is input to level compressor 14 when the test signal free of a DC offset is input to frequency converter 12 is input level 2, then, as shown in FIG. 28, the gain with respect input levels lower than input level 2 is greater than a minimum required. The level compression is performed by lowering the level at the time the input level that contributes finally to the saturation is large.

With the arrangement of amplitude detector 13 and level compressor 14 according to the present inventive example, the test signal can be compared highly accurately by a simple arrangement without the need for a circuit which is large in scale and power consumption, such as VGA. As a result, a DC offset of the transmitter can be adjusted by an arrangement which is small in scale and low in power consumption.

While the arrangement of FIG. 11 is illustrated, the arrangement of FIG. 22 is also applicable as another example.

10th INVENTIVE EXAMPLE

In a DC offset correcting device according to a tenth inventive example, amplitude detector 13 and level compressor 14 shown in FIG. 4 comprise the circuit shown in FIG. 23. In FIG. 23, amplitude detector 13 comprises a diode circuit, and level compressor 14 comprises a grounded-emitter transistor circuit.

In amplitude detector 13 according to the present inventive example, diode D2 detects the RF signal and supplies the detected level signal to level compressor 14. The bias point of transistor T4 of level compressor 14 is set such that gain $G_{IF}$ is smaller as the amplitude of the RF signal output from frequency converter 12 is greater, as shown in FIG. 27. If the level of the signal that is input to level compressor 14 when the test signal free of a DC offset is input to frequency converter 12 is input level 2, then, as shown in FIG. 28, the gain with respect input levels lower than input level 2 is greater than a minimum required. The level compression is performed by lowering the level at the time the input level that contributes finally to the saturation is large.

With the arrangement of amplitude detector 13 and level compressor 14 according to the present inventive example, the test signal can be compared highly accurately by a simple arrangement without the need for a circuit which is large in scale and power consumption, such as VGA. As a result, a DC offset of the transmitter can be adjusted by an arrangement which is small in scale and low in power consumption.

While the arrangement of FIG. 23 is illustrated, the arrangement of FIG. 24 is also applicable as another example.

11th INVENTIVE EXAMPLE

Figure 29:
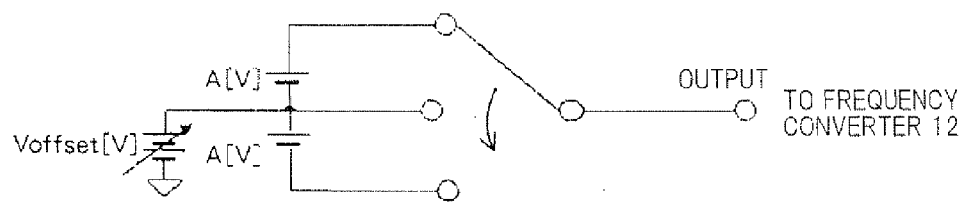
FIG. 29 is a diagram showing an example of the circuit of signal generator 11.

In a DC offset correcting device according to an eleventh inventive example, signal generator 11 shown in FIG. 4 comprises the circuit shown in FIG. 29. As shown in FIG. 29, signal generator 11 comprises a positive and negative signal generating signal source for generating a positive signal and a negative signal which have equal amplitudes A [V] from a reference voltage and also generating the reference voltage, and an offset applying signal source for applying a DC offset correcting signal $V_{offset}$ [V] to the reference voltage, The offset correcting signal source has an output terminal connected to the reference potential of the positive and negative signal generating signal source. Signal generator 11 is connected to frequency converter 12 by a switch which selectively outputs $V_{offset}+A$, $V_{offset}$, $V_{offset}-A$. The test signal is generated when the switch outputs positive signal $V_{offset}+A$ and negative signal $V_{offset}-A$. The test signal makes it possible to correct a DC offset appropriately. After a DC offset is corrected appropriately, reference voltage $V_{offset}$ is output to keep a carrier leak suppressed. An example of the test signal generated by the circuit shown in FIG. 29 is shown in FIG. 5.

The test signal is not limited to the pulse signal shown in FIG. 5. The test signal may have equal amplitudes of positive and negative signals from the reference voltage (reference current). The positive signal and the negative signal may appear in any order. The positive signal and the negative signal may be spaced from each other at any intervals, and may be spaced from each other by any signal waveforms therebetween.

Signal generator 11 of the simple arrangement according to the present inventive example allows a DC offset of the test signal comprising the positive and negative signals having the same amplitude, to be corrected appropriately.

12th INVENTIVE EXAMPLE

In a DC offset correcting device according to a twelfth inventive example, the comparator shown in FIG. 4 comprises the circuit shown in FIG. 17. Comparator 15 comprises positive signal level holder 21, negative signal level holder 22, and differential signal output unit 23.

Positive signal level holder 21 holds the detected level of the positive signal of the level-compressed detected signal from level compressor 14. Negative signal level holder 22 holds the detected level of the negative signal of the level-compressed detected signal from level compressor 14. Difference signal output unit 23 compares the detected level from positive signal level holder 21 and the detected level from negative signal level holder 22 with each other, and outputs the compared result as a difference signal.

The level-compressed detected signal from level compressor 14 is input to positive signal level holder 21 and negative signal level holder 22.

Positive signal level holder 21 holds the level of the positive signal depending on a positive signal trigger indicative of the timing of the positive signal. The positive signal input from signal generator 11 may be used as a positive signal trigger, or a signal generated while the positive signal is being generated by signal generator 11 may be used as a positive signal trigger.

Negative signal level holder 22 holds the level of the negative signal depending on a negative signal trigger indicative of the timing of the negative signal. The negative signal input from signal generator 11 may be used as a negative signal trigger, or a signal generated while the negative signal is being generated by signal generator 11 may be used as a positive signal trigger.

The detected level of the detected positive signal held by positive signal level holder 21 and the detected level of the detected negative signal held by negative signal level holder 22 are input to differential signal output unit 23, The signal output from positive signal level holder 21 is a DC voltage output signal. The signal output from negative signal level holder 22 is a DC voltage output signal.

Differential signal output unit 23 compares the detected level of the detected positive signal input thereto and the detected level of the detected negative signal input thereto with each other, and outputs the compared result.

The compared result output from differential signal output unit 23 may be, for example, a signal representing which detected level is higher or a differential signal representing the level difference between the detected level of the positive signal and the detected level of the negative signal.

One specific example of a circuit for determining which detected level is higher is a comparator. If the detected level of the positive signal is lower than the detected level of the negative signal, then the comparator may output an inverted output signal, and if the detected level of the positive signal is higher than the detected level of the negative signal, then the comparator may output a non-inverted output signal. Thus, the compared result may be represented by a binary value of the inverted output signal or the non-inverted output signal.

A specific example of a circuit for outputting the level difference as a differential signal is an operational amplifier or an arithmetic circuit comprising a subtractor.

When comparator 15 of the simple arrangement according to the present inventive example supplies the compared result to offset adjuster 16, offset adjuster 16 generates a DC offset correcting signal depending on the compared result, and feeds back the DC offset correcting signal to signal generator 11.

13th INVENTIVE EXAMPLE

In a DC offset correcting device according to a thirteenth inventive example, the comparator shown in FIG. 4 comprises the circuit shown in FIG. 19. Comparator 15 comprises sample and hold circuit 41, sample and hold circuit 42, and comparator 43.

Sample and hold circuit 41 samples and holds the detected level of the positive signal from level compressor 14. Sample and hold circuit 42 samples and holds the detected level of the negative signal from level compressor 14. Comparator 43 compares the detected level held by sample and hold circuit 41 and the detected level held by sample and hold circuit 42 with each other, and outputs the compared result as a differential signal.

According to the present inventive example, a comparator is used as differential signal output unit 23 according to the twelfth inventive example.

The detected signal that is compressed in level by level compressor 14 is input to sample and hold circuit 41 and sample and hold circuit 42.

Positive signal level holder 41 holds the level of the positive signal depending on a positive signal trigger indicative of the timing of the positive signal. The positive signal input from signal generator 11 may be used as the positive signal trigger, or a signal generated while the positive signal is being generated by signal generator 11 may be used as the positive signal trigger.

Negative signal level holder 42 holds the level of the negative signal depending on a negative signal trigger indicative of the timing of the negative signal. The negative signal input from signal generator 11 may be used as the negative signal trigger, or a signal generated while the negative signal of the test signal is being generated by signal generator 11 may be used as the negative signal trigger.

The detected level of the detected positive signal held by sample and hold circuit 41 and the detected level of the detected negative signal held by sample and hold circuit 42 are input to comparator 43. The signal output from sample and hold circuit 41 is a DC voltage output signal. The signal output from sample and hold circuit 42 is a DC voltage output signal. Comparator 43 compares the detected levels with each other, and outputs the compared result. The compared result indicates whether the DC offset of the test signal is shifted in the positive direction or shifted in the negative direction.

For example, if the detected level of the positive signal is lower than the detected level of the negative signal, then comparator 43 may output an inverted output signal, and if the detected level of the positive signal is higher than the detected level of the negative signal, then comparator 43 may output a non-inverted output signal. Thus, the compared result may be represented by a binary value of the inverted output signal or the non-inverted output signal.

The differential indicative of which one of the detected levels is greater and how much it is greater may not necessarily be required. For example, if the binary value of the inverted output signal or the non-inverted output signal indicates the direction in which the DC offset of the test signal is TO shifted, then it shows which direction the DC offset may be corrected in.

Comparator 43 in the form of the simple circuit according to the present inventive example makes it easy to give offset adjuster 16 information as to the direction of the DC shift. Accordingly, the circuit arrangement of comparator 15 and offset adjuster 16 following comparator 15 can be simplified.

Since the detected levels of the detected signals from level compressor 14 appear in a time sequence, the detected levels in the time sequence may be input parallel from sample and hold circuits 41, 42 to comparator 43. Comparator 15 according to the present inventive example can compare the detected levels with each other with a simple circuit.

14th INVENTIVE EXAMPLE

In a DC offset correcting device according to a fourteenth inventive example, the comparator shown in FIG. 4 comprises the circuit shown in FIG. 20. Comparator 15 comprises sample and hold circuit 51 and comparator 43.

Sample and hold circuit 51 samples and holds the detected level of the positive signal (or the negative signal) from level compressor 14. Comparator 52 compares the detected level held by sample and hold circuit 51 and the detected level of the positive signal (or the negative signal) from level compressor 14 with each other, and outputs the compared result as a differential signal.

Sample and hold circuit 51 uses a trigger which is the same as the triggers used in the twelfth and thirteenth embodiments.

When sample and hold circuit 51 holds the level of the positive signal depending on the positive signal trigger, sample and hold circuit 51 may use the positive signal input from signal generator 11 as the positive signal trigger, or may use a signal generated while the positive signal is being generated by signal generator 11 as the positive signal trigger.

When sample and hold circuit 42 holds the level of the negative signal depending on the negative signal trigger, sample and hold circuit 42 may use the negative signal input from signal generator 11 as the negative signal trigger, or may use a signal generated while the negative signal of the test signal is being generated by signal generator 11 as the negative signal trigger.

The detected level of the positive signal (or the negative signal) held by sample and hold circuit 51 and the detected level of the detected negative signal from level compressor 14 are input to comparator 52. The signal output from sample and hold circuit 51 is a DC voltage output signal.

Comparator 52 compares the detected levels with each other in the timing of the negative signal (or the positive signal), and outputs the compared result. The compared result indicates whether the DC offset of the test signal is shifted in the positive direction or shifted in the negative direction.

As with the thirteenth inventive example, if the detected level of the positive signal is lower than the detected level of the negative signal, then comparator 52 may output an inverted output signal, and if the detected level of the positive signal is higher than the detected level of the negative signal, then comparator 52 may output a non-inverted output signal. Thus, the compared result may be represented by a binary value of the inverted output signal or the non-inverted output signal.

According to the present inventive example, comparator 51 may be implemented by a simple circuit comprising a single sample and hold circuit and a comparator. Specifically, the sample and hold circuit holds the detected level of the detected positive signal (or the detected negative signal) from the level-compressed detected signal which represents the detected level of the positive signal and the detected level of the negative signal in the time sequence, and the comparator compares the detected DC level of the detected positive signal (or the detected negative signal) and the detected level of the detected negative signal (or the detected positive signal) of the level-compressed detected signal with each other in the timing of the negative signal (or the positive signal). Therefore, the circuit is simplified.

15th INVENTIVE EXAMPLE

In a DC offset correcting device according to a fifteenth inventive example, the comparator shown in FIG. 4 comprises the circuit shown in FIG. 18. Comparator 15 comprises A/D converter 31, positive signal level register 32, negative signal level register 33, and subtractor 34.

A/D converter 31 converts the analog value representing the detected level of the level-compressed detected analog signal from level compressor 14 into a digital value (digital signal). Positive signal level register 32 is supplied with the level-compressed detected digital signal, and records a digital value corresponding to the detected level of the detected positive signal, from the supplied level-compressed detected digital signal. Negative signal level register 33 is supplied with the level-compressed detected digital signal, and records a digital value corresponding to the detected level of the detected negative signal, from the supplied level-compressed detected digital signal. Subtractor 34 subtracts the digital value recorded in negative signal level register 33 from the digital value recorded in positive signal level register 32.

The level-compressed detected signal from level compressor 14 is input to A/D converter 31. The detected level of the level-compressed detected signal is converted by A/D converter 31 into a digital value, which is input to positive signal level register 32 and negative signal level register 33.

Positive signal level register 32 records the digital value of the positive signal depending on a positive signal trigger indicative of the timing of the positive signal. The positive signal input from signal generator 11 may be used as the positive signal trigger, or a signal generated while the positive signal is being generated by signal generator 11 may be used as the positive signal trigger.

Negative signal level register 33 records the digital value of the negative signal depending on a negative signal trigger indicative of the timing of the negative signal. The negative signal input from signal generator 11 may be used as the negative signal trigger, or a signal generated while the negative signal is being generated by signal generator 11 may be used as the negative signal trigger.

The digital value recorded in positive signal level register 32 and the digital value recorded in negative signal level register 33 are input to subtractor 34.

Subtractor 36 subtracts the digital value of negative signal level register 33 from the digital value of positive signal level register 32, for example, and outputs the difference. The difference from subtractor 36 is input to offset adjuster 16. Depending on the difference, offset adjuster 16 generates a DC offset correcting signal for DC offset correction.

According to the present inventive example, comparator 15 in the form of a digital circuit is capable of comparing the digital levels and outputting the compared result to offset adjuster 16, in the same manner as with the twelfth through fourteenth inventive examples in which the analog levels are compared with each other.

16th INVENTIVE EXAMPLE

Figure 30:
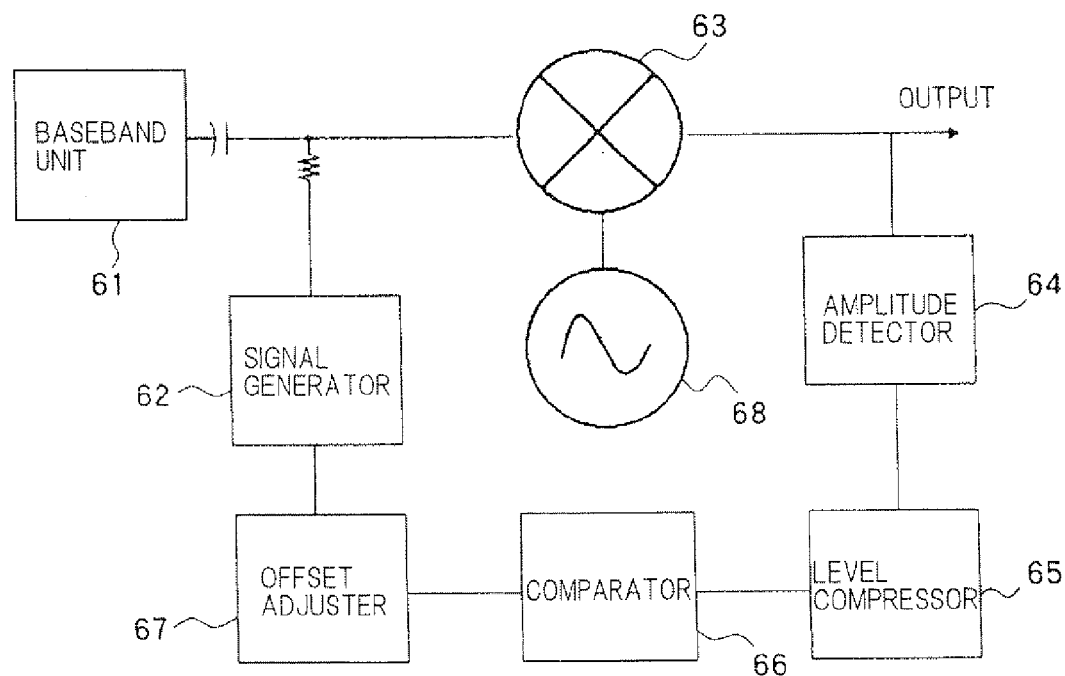
FIG. 30 is a block diagram showing the arrangement of a DC offset correcting device according to a sixteenth inventive example of the present invention.

FIG. 30 is a block diagram showing the arrangement of a DC offset correcting device according to a sixteenth inventive example of the present invention. As shown in FIG. 30, the DC offset correcting device according to the sixteenth inventive example comprises baseband unit 61, signal generator 62, mixer 63, amplitude detector 64, level compressor 65, comparator 66, offset adjuster 67, and local oscillator 68.

Frequency converter 12 shown in FIG. 4 corresponds to mixer 63 and local oscillator 68 in FIG. 30. Signal generator 62 and baseband unit 61 are connected to mixer 63.

A baseband signal from baseband unit 61 is input to mixer 63, which mixes the baseband signal with a local oscillation signal (local signal) from local oscillator 68, thereby converting the frequency of the baseband signal. The local oscillation signal from local oscillator 68 has a predetermined frequency. The RF signal which is frequency-converted by mixer 63 is processed at high frequencies for power amplification, if necessary, and then output.

Similarly, a test signal from signal generator 62 is input to mixer 63, which mixes the test signal with the local oscillation signal from local oscillator 68, thereby converting the frequency of the test signal. The local oscillation signal from local oscillator 68 has a predetermined frequency. The RF signal which is frequency-converted by mixer 63 is processed at high frequencies for power amplification, if necessary, and then output.

The signal sent from mixer 63 to amplitude detector 64 is a signal having a certain high-frequency component, rather than a DC signal or a low-frequency signal, because of the frequency conversion. If amplitude detector 64 comprises an envelope detector, then it can easily achieve amplitude detection by way of envelope detection The high-frequency signal from mixer 63 is transmitted to a desired party via an antenna, for example. Signal generator 62, amplitude detector 64, level compressor 65, comparator 66, and offset adjuster 67 may be of the same arrangement as signal generator 11, level compressor 14, comparator 15, and offset adjuster 16 shown in FIG. 4.

Figure 31:
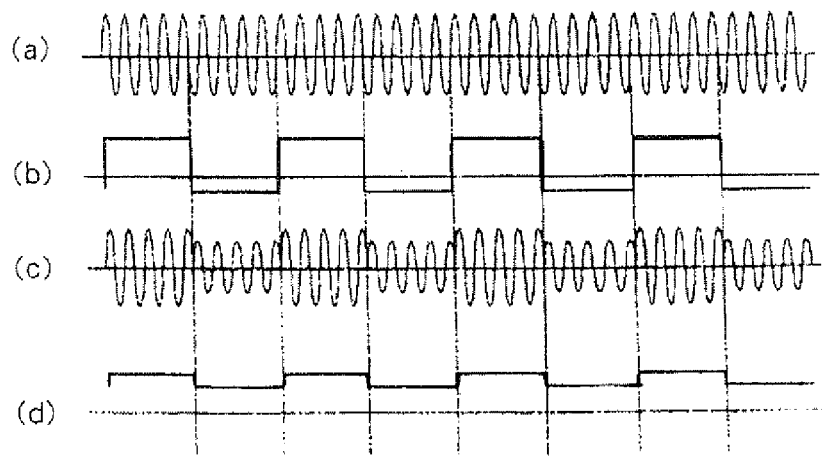
FIG. 31 is a timing chart of signals in various portions before a DC offset is corrected.
Figure 32:
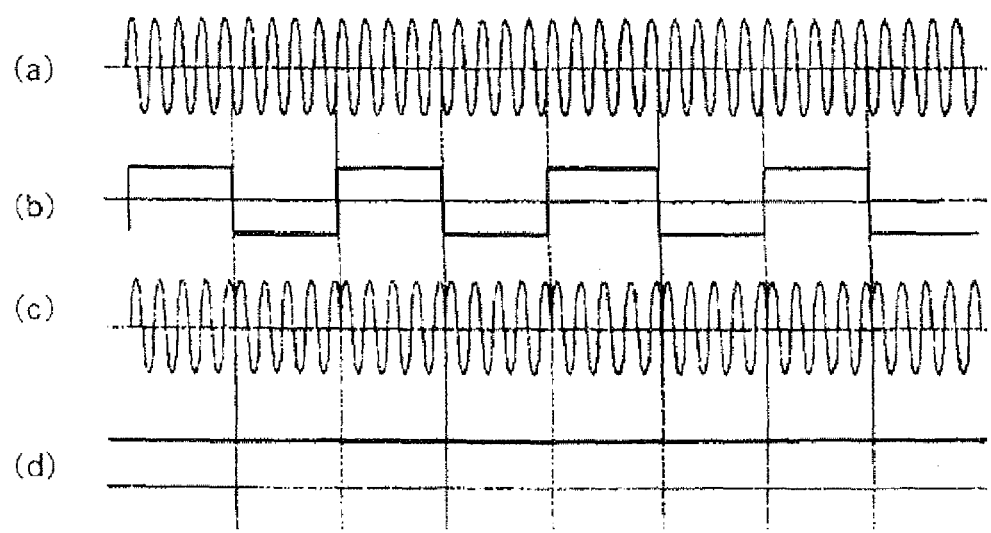
FIG. 32 is a timing chart of signals in various portions after the DC offset is corrected.

FIG. 31 is a timing chart of signals in various portions before a DC offset is corrected. FIG. 32 is a timing chart of signals in various portions after the DC offset is corrected. In FIGS. 31, 32, (a) shows the local oscillation signal that is input from local oscillator 68 to mixer 63, (b) the test signal or the baseband signal input to mixer 63, (c) the high-frequency signal output from mixer 63, and (d) the envelope-detected signal, which has been compressed in level, output from level compressor 65.

It can be seen from (b) in FIG. 31 that since the DC offset is not corrected, the DC level of the test signal (or the baseband signal) is shifted in the positive direction. Therefore, as shown in (c) in FIG. 31, the amplitude of the high-frequency signal that is modulated by the positive signal and the amplitude of the high-frequency signal that is modulated by the negative signal are different from each other. As a result, as shown in (d) in FIG. 31, when the high-frequency signal is envelope-detected, the detected signal is not of a constant amplitude, but of a fluctuating amplitude.

It can be seen from (b) in FIG. 32 that since the DC offset is corrected, the DC level of the test signal (or the baseband signal) is eliminated. Therefore, the amplitude of the positive signal and the amplitude of the negative signal are equal to each other, and as shown in (c) in FIG. 32, the amplitude of the high-frequency signal that is modulated by the positive signal and the amplitude of the high-frequency signal that is modulated by the negative signal are equal to each other. As a result, as shown in (d) in FIG. 33, when the high-frequency signal is envelope-detected, the detected signal is of a constant amplitude.

As described above, if there is a DC shift, the detected level of the signal output from level compressor 65 changes, causing the detected level of the detected positive signal and the detected negative signal to be different from each other. However, when the DC offset is corrected, the change in the detected level of the signal output from level compressor 65 is removed, thereby equalizing the detected level of the detected positive signal and the detected negative signal to each other.

When the detected level of the detected positive signal and the detected negative signal are equal to each other, the DC offset is corrected well and the DC level is shift-free, making it possible to perform high-quality communications free of a carrier leak.

17th INVENTIVE EXAMPLE

In a DC offset correcting device according to a seventeenth inventive example, signal generator 11 shown in FIG. 4 comprises a differential circuit.

For outputting the test signal shown in FIG. 5, signal generator 11 shown in FIG. 4 is generally of such an arrangement that it generates the test signal by amplifying a pulse signal generated by a pulse signal generating circuit to a desired amplitude with a power amplifier.

It is assumed that a test signal whose positive and negative signals have the same amplitude from a reference level (reference voltage) is generated, power-amplified, and input to frequency converter 12. If the power amplifier comprises a nonlinear circuit having the characteristics shown in FIG.

21(a), then the positive and negative signals of the amplified test signal have different amplitudes due to the nonlinearity of the power amplifier.

Inasmuch as the amplitudes of the positive and negative signals of the test signal are different from each other, comparator 15 produces an error in comparing the levels of the detected positive signal and the detected negative signals. As a result, the DC offset cannot be corrected accurately.

According to the present inventive example, signal generator 11 comprises a differential circuit (or a differential amplifying circuit) for generating a test signal including positive and negative signals whose amplitudes are equal to each other.

As shown in FIG. 21(b), the pulse signal generating circuit outputs a test signal whose positive and negative signals have the same amplitude from a reference level (reference voltage), and a signal in phase with the test signal and a signal in reverse phase to the test signal are input to the nonlinear power amplifier. According to the present inventive example, the power amplifier comprises a differential circuit. The in-phase signal and the reverse-phase signal are input respectively to two transistors of the differential circuit.

Because of the nonlinearity of the transistors, the positive and negative signals of the in-phase signal have different amplitudes, and the positive and negative signals of the reverse-phase signal also have different amplitudes. However, these amplitude differences are canceled by the differential circuit, and the power amplifier outputs an ideal test signal whose positive and negative signals have the same amplitude.

Using the test signal thus generated, comparator 15 can compare the levels free of an error. Therefore, the DC shift of the test signal can be detected accurately, and the DC offset can be corrected accurately.

The invention claimed is:

1. A DC offset correcting device for correcting a DC offset of a frequency converter, comprising:
    a signal generator connected to the frequency converter for generating a test signal including a first signal having a predetermined amplitude from a reference voltage in a first direction and a second signal having the same amplitude as the first signal from said reference voltage in a second direction opposite the first direction, correcting a DC level of the test signal based on a DC offset correcting signal supplied thereto, and supplying the corrected test signal to the frequency converter;
    an amplitude detector connected to the frequency converter for detecting the amplitudes of the first and second signals of the test signal processed by the frequency converter;
    a level compressor connected to the amplitude detector for converting in level the amplitudes of the first and second signals which are detected by said amplitude detector, with a gain variable depending on an input level thereto;
    a comparator connected to the level compressor for comparing the amplitudes of the first and second signals which are converted in level by said level compressor, with each other; and
    an offset adjuster connected to the comparator and the signal generator for generating said DC offset correcting signal depending on a compared result from said comparator, and supplying the DC offset correcting signal to said signal generator.

2. A DC offset correcting device according to claim 1, wherein said gain of said level compressor decreases monotonously as said input level increases in a predetermined range.

3. A DC offset correcting device according to claim 2, wherein said gain of said level compressor decreases monotonously in a range of the input level which is greater than a first input level at which the gain is greater than a predetermined value, and a second input level which represents the amplitudes of the first and second signals of said test signal supplied from said amplitude detector to said level compressor when the test signal from which said DC offset is removed is input to said frequency converter, is in range from 50% to 150% of said first input level.

4. A DC offset correcting device according to claim 3, wherein said gain of said level compressor has a peak at said first input level and increases monotonously in a range of the input level which is smaller than the first input level.

5. A DC offset correcting device according to claim 1, wherein said offset adjuster generates said offset adjusting signal to equalize the amplitudes of the first and second signals in said comparator.

6. A DC offset correcting device according to claim 1, wherein said amplitude detector and said level compressor each comprises an integrated circuit.

7. A DC offset correcting device according to claim 1, wherein said amplitude detector comprises a diode circuit and said level compressor comprises a transistor circuit.

8. A DC offset correcting device according to claim 6, wherein said transistor circuit comprises a grounded-source field-effect transistor circuit.

9. A DC offset correcting device according to claim 7, wherein said transistor circuit comprises a grounded-source field-effect transistor circuit.

10. A DC offset correcting device according to claim 6, wherein said transistor circuit comprises a grounded-emitter bipolar transistor circuit.

11. A DC offset correcting device according to claim 7, wherein said transistor circuit comprises a grounded-emitter bipolar transistor circuit.

12. A DC offset correcting device according to claim 1, wherein said comparator comprises:
    a first signal level holding circuit for holding the level of the amplitude of said first signal which is converted in level by said level compressor;
    a second signal level holding circuit for holding the level of the amplitude of said second signal which is converted in level by said level compressor; and
    a differential signal output circuit for outputting a differential signal representative of the difference between the level of the amplitude of said first signal which is held by said first signal level holding circuit and the level of the amplitude of said second signal which is held by said second signal level holding circuit.

13. A DC offset correcting device according to claim 1, wherein said comparator comprises:
    a first signal sample and hold circuit for holding the level of the amplitude of said first signal while said amplitude of said first signal is being detected by said amplitude detector;
    a second signal sample and hold circuit for holding the level of the amplitude of said second signal while said amplitude of said second signal is being detected by said amplitude detector; and
    a comparator for comparing the level of the amplitude of said first signal which is held by said first signal sample and hold circuit and the level of the amplitude of said second signal which is held by said second signal sample and hold circuit.

14. A DC offset correcting device according to claim 1, wherein said comparator comprises:

a sample and hold circuit for holding either one of the level of the amplitude of said first signal and the level of the amplitude of said second signal; and a comparator for comparing the level of either one of said first signal and said second signal which is held by said sample and hold circuit and the level of the other of said first signal and said second signal which is converted in level by said level compressor.

15. A DC offset correcting device according to claim 1, wherein said comparator comprises:

an analog-to-digital converter for converting the amplitude of said first signal and the amplitude of said second signal which are converted in level by said level compressor, into digital values;

a first signal level register for holding the digital value representative of the amplitude of said first signal which is produced by said analog-to-digital converter;

a second signal level register for holding the digital value representative of the amplitude of said second signal which is produced by said analog-to-digital converter; and a subtractor for calculating the difference between the digital value representative of the amplitude of said first signal which is held by said first signal level register and the digital value representative of the amplitude of said second signal which is held by said second signal level register.

16. A DC offset correcting device according to claim 1, wherein said signal generator comprises a differential circuit.

17. A DC offset correcting device according to claim 1, wherein said amplitude detector detects the amplitude of said test signal using envelope detection.

18. A method of correcting a DC offset of a frequency converter, comprising:

generating a test signal including a first signal having a predetermined amplitude from a reference voltage in a first direction and a second signal having the same amplitude as the first signal from said reference voltage in a second direction opposite the first direction, and supplying the test signal to the frequency converter;

detecting the amplitudes of the first and second signals of the test signal processed by the frequency converter;

converting in level the amplitudes of the first and second signals which are detected, with a gain variable depending on an input level;

comparing the amplitudes of the first and second signals which are converted in level, with each other;

generating a DC offset correcting signal depending on a compared result; and correcting a DC level of said test signal to be sent to said frequency converter, based on said DC offset correcting signal.

19. A method according to claim 18, wherein said gain decreases monotonously as said input level increases in a predetermined range.

20. A method according to claim 19, wherein said gain decreases monotonously in a range of the input level which is greater than a first input level at which the gain is greater than a predetermined value, and a second input level which represents the amplitudes of the first and second signals of said test signal supplied from said amplitude detector to said level compressor when the test signal from which said DC offset is removed is input to said frequency converter, is in range from 50% to 150% of said first input level.

21. A method according to claim 20, wherein said gain has a peak at said first input level and increases monotonously in a range of the input level which is smaller than the first input level.

22. A method according to claim 18, wherein said offset adjusting signal is generated to equalize the amplitudes of the first and second signals which are converted in level.

* * * * *